US010282127B2

(12) United States Patent
Battaje et al.

(10) Patent No.: US 10,282,127 B2
(45) Date of Patent: May 7, 2019

(54) MANAGING DATA IN A STORAGE SYSTEM

(71) Applicant: Western Digital Technologies, Inc., San Jose, CA (US)

(72) Inventors: Ajith Kumar Battaje, Karnataka (IN); Tanay Goel, Chhattisgarh (IN); Saurabh Manchanda, Bangalore (IN); Sandeep Sharma, Karnataka (IN)

(73) Assignee: WESTERN DIGITAL TECHNOLOGIES, INC., San Jose, CA (US)

(*) Notice: Subject to any disclaimer, the term of this patent is extended or adjusted under 35 U.S.C. 154(b) by 54 days.

(21) Appl. No.: 15/492,221

(22) Filed: Apr. 20, 2017

(65) Prior Publication Data
US 2018/0307432 A1    Oct. 25, 2018

(51) Int. Cl.
*G06F 3/06* (2006.01)
*G06F 12/0891* (2016.01)

(52) U.S. Cl.
CPC ............ *G06F 3/0641* (2013.01); *G06F 3/067* (2013.01); *G06F 3/0608* (2013.01); *G06F 3/0656* (2013.01); *G06F 12/0891* (2013.01); *G06F 2212/1044* (2013.01); *G06F 2212/60* (2013.01)

(58) Field of Classification Search
CPC ...... G06F 3/06; G06F 3/0641; G06F 12/0891; G06F 3/0608; G06F 3/067; G06F 3/0656
See application file for complete search history.

(56) References Cited

U.S. PATENT DOCUMENTS

| 5,193,162 A * | 3/1993 | Bordsen .............. G06F 11/1471 707/999.008 |
| 6,374,250 B2 | 4/2002 | Ajtai et al. |
| 7,523,098 B2 | 4/2009 | Hirsch et al. |
| 7,567,188 B1 | 7/2009 | Anglin et al. |
| 7,636,745 B1 | 12/2009 | Detlefs |

(Continued)

FOREIGN PATENT DOCUMENTS

| JP | 2010218194 A | 9/2010 |
| JP | 2013541083 A | 11/2013 |
| WO | 2012031047 A1 | 3/2012 |

OTHER PUBLICATIONS

"Jin et al. "The Effectiveness of Deduplication on Virtual MachineDisk Images" dated 2009, 12 pages.".

(Continued)

*Primary Examiner* — Pierre Miche Bataille
(74) *Attorney, Agent, or Firm* — Loza & Loza, LLP; Gabriel Fitch

(57) ABSTRACT

Various aspects for managing data blocks in a storage system are provided. For instance, a method may include storing, in a buffer memory device, a comparison block library, selecting a first set of comparison blocks in the comparison block library to create an active set of comparison blocks, and utilizing the active set in conjunction with a data deduplication technique. A method may further include determining an occurrence of a predetermined event in the data deduplication technique, selecting a second set of comparison blocks in the comparison block library to create a new active set of comparison blocks in response to the predetermined event, replacing the active set with the new active set, and utilizing the new active set in conjunction with the data deduplication technique.

20 Claims, 13 Drawing Sheets

(56) References Cited

U.S. PATENT DOCUMENTS

| | | | |
|---|---|---|---|
| 7,774,556 | B2 | 8/2010 | Karamcheti |
| 7,822,758 | B1 | 10/2010 | Prakash |
| 8,065,268 | B1 | 11/2011 | Ghemawat |
| 8,082,231 | B1 | 12/2011 | McDaniel et al. |
| 8,099,571 | B1 | 1/2012 | Driscoll |
| 8,108,446 | B1 * | 1/2012 | Christiaens ............ G06F 3/0608 707/693 |
| 8,135,683 | B2 | 3/2012 | Douglis et al. |
| 8,156,306 | B1 | 4/2012 | Raizen et al. |
| 8,195,636 | B2 | 6/2012 | Stager et al. |
| 8,244,691 | B1 | 8/2012 | Ramarao |
| 8,250,325 | B2 | 8/2012 | Holdman et al. |
| 8,260,752 | B1 | 9/2012 | Stringham |
| 8,280,926 | B2 | 10/2012 | Sandorfi et al. |
| 8,364,652 | B2 | 1/2013 | Vijayan et al. |
| 8,370,305 | B2 | 2/2013 | Petrocelli |
| 8,392,376 | B2 | 3/2013 | Guo |
| 8,392,384 | B1 | 3/2013 | Wu et al. |
| 8,463,825 | B1 | 6/2013 | Harty |
| 8,489,611 | B2 | 7/2013 | Tofano |
| 8,495,028 | B2 | 7/2013 | Reiter et al. |
| 8,504,533 | B2 | 8/2013 | Dewey et al. |
| 8,527,544 | B1 | 9/2013 | Colgrove |
| 8,631,052 | B1 | 1/2014 | Shilane et al. |
| 8,667,032 | B1 | 3/2014 | Shilane et al. |
| 8,712,978 | B1 | 4/2014 | Shilane et al. |
| 8,725,705 | B2 | 5/2014 | Hirsch et al. |
| 8,751,462 | B2 | 6/2014 | Huang et al. |
| 8,874,532 | B2 | 10/2014 | Anglin et al. |
| 8,898,120 | B1 | 11/2014 | Efstathopoulos |
| 8,898,410 | B1 | 11/2014 | Ehrenberg |
| 8,914,338 | B1 | 12/2014 | Wallace et al. |
| 8,918,390 | B1 | 12/2014 | Shilane et al. |
| 8,954,398 | B1 | 2/2015 | Zhang et al. |
| 8,972,672 | B1 | 3/2015 | Wallace et al. |
| 9,021,203 | B2 | 4/2015 | Hyde, II et al. |
| 9,141,301 | B1 | 9/2015 | Wallace et al. |
| 9,152,335 | B2 | 10/2015 | Sundaram et al. |
| 9,268,783 | B1 | 2/2016 | Shilane et al. |
| 9,298,724 | B1 | 3/2016 | Patil et al. |
| 9,400,610 | B1 | 7/2016 | Wallace et al. |
| 9,413,527 | B2 | 8/2016 | Yang et al. |
| 2006/0136365 | A1 | 6/2006 | Kedem et al. |
| 2006/0184505 | A1 | 8/2006 | Kedem et al. |
| 2009/0112880 | A1 | 4/2009 | Oliveira et al. |
| 2009/0171990 | A1 | 7/2009 | Naef, III |
| 2010/0125553 | A1 | 5/2010 | Huang et al. |
| 2010/0281208 | A1 | 11/2010 | Yang |
| 2010/0318759 | A1 | 12/2010 | Hamilton et al. |
| 2011/0035357 | A1 * | 2/2011 | Ting .................... G06F 11/1435 707/634 |
| 2011/0066628 | A1 | 3/2011 | Jayaraman |
| 2011/0167096 | A1 | 7/2011 | Guo |
| 2011/0176493 | A1 | 7/2011 | Kiiskila et al. |
| 2011/0196829 | A1 | 8/2011 | Vickrey et al. |
| 2011/0225214 | A1 | 9/2011 | Guo |
| 2011/0238635 | A1 | 9/2011 | Leppard |
| 2011/0246741 | A1 | 10/2011 | Raymond et al. |
| 2011/0314205 | A1 | 12/2011 | Nagata |
| 2012/0059800 | A1 | 3/2012 | Guo |
| 2012/0072652 | A1 * | 3/2012 | Celis .................... G06F 12/121 711/103 |
| 2012/0124105 | A1 | 5/2012 | Provenzano |
| 2012/0137059 | A1 | 5/2012 | Yang et al. |
| 2012/0185612 | A1 | 7/2012 | Zhang |
| 2012/0191670 | A1 | 7/2012 | Kennedy |
| 2012/0191672 | A1 | 7/2012 | Jayaraman |
| 2013/0036289 | A1 | 2/2013 | Welnicki et al. |
| 2013/0041872 | A1 | 2/2013 | Aizman et al. |
| 2013/0054524 | A1 | 2/2013 | Anglin et al. |
| 2013/0073798 | A1 | 3/2013 | Kang et al. |
| 2013/0117516 | A1 * | 5/2013 | Sobolewski ............ G06F 12/16 711/162 |
| 2013/0243190 | A1 | 9/2013 | Yang et al. |
| 2013/0262758 | A1 | 10/2013 | Smith et al. |
| 2013/0297569 | A1 | 11/2013 | Hyde, II et al. |
| 2013/0297872 | A1 | 11/2013 | Hyde, II et al. |
| 2014/0025770 | A1 | 1/2014 | Warfield et al. |
| 2014/0143288 | A1 | 5/2014 | Grunwald et al. |
| 2014/0172794 | A1 | 6/2014 | Bartholoma et al. |
| 2014/0279953 | A1 | 9/2014 | Aronovich |
| 2014/0279956 | A1 | 9/2014 | Trimble |
| 2014/0281167 | A1 | 9/2014 | Danilak et al. |
| 2014/0297779 | A1 | 10/2014 | Pack et al. |
| 2014/0317352 | A1 | 10/2014 | Kleen |
| 2015/0010143 | A1 | 1/2015 | Yang |
| 2015/0019504 | A1 | 1/2015 | Aronovich |
| 2015/0019797 | A1 | 1/2015 | Huang et al. |
| 2015/0019816 | A1 | 1/2015 | Akirav et al. |
| 2015/0074065 | A1 | 3/2015 | Christ et al. |
| 2015/0081993 | A1 | 3/2015 | Christopher et al. |
| 2015/0220277 | A1 | 8/2015 | Lee et al. |
| 2015/0261797 | A1 | 9/2015 | Alcantara et al. |
| 2015/0363418 | A1 | 12/2015 | Barajas Gonzalez et al. |
| 2016/0092138 | A1 | 3/2016 | Knestele et al. |
| 2016/0092143 | A1 | 3/2016 | Furlong |
| 2016/0179386 | A1 | 6/2016 | Zhang |
| 2016/0182088 | A1 | 6/2016 | Sipos et al. |
| 2016/0328154 | A1 | 11/2016 | Mizushima et al. |
| 2016/0335024 | A1 | 11/2016 | Zhong et al. |
| 2016/0371267 | A1 | 12/2016 | Narasimha et al. |
| 2016/0371292 | A1 | 12/2016 | Narasimha et al. |
| 2017/0017650 | A1 | 1/2017 | Ciabarra, Jr. et al. |
| 2017/0038978 | A1 | 2/2017 | Li et al. |
| 2017/0039219 | A1 | 2/2017 | Acharya |
| 2017/0123676 | A1 | 5/2017 | Singhai et al. |
| 2017/0123677 | A1 | 5/2017 | Singhai et al. |
| 2017/0123678 | A1 | 5/2017 | Singhai et al. |
| 2017/0123689 | A1 | 5/2017 | Singhai et al. |
| 2017/0235496 | A1 | 8/2017 | Brosch |
| 2017/0293450 | A1 * | 10/2017 | Battaje .................. G06F 3/0641 |
| 2018/0349053 | A1 | 12/2018 | Battaje et al. |

OTHER PUBLICATIONS

Debnath et al. "ChunkStash: Speeding up Inline Storage Deduplication using Flash Memory" dated 2010, 15 pages.

Datamartist "Star Schema Part 2-Defining a Reference and Mapping Away Duplicate Records" dated 2010, retrieved from http://www.datamartist.com/resources/datamartist-doc-files/V1_3_Documentation/DM-Using-referenceand-dedupe-Doc.html on Nov. 17, 2015, 4 pages, nModal Solutions Inc.

Xia et al. "SiLo A Similarity-Locality based Near-Exact Deduplication Scheme with Low RAM Overhead and High Throughput" dated 2011, 14 pages.

Toon et al. "Efficient Deduplication Techniques for Modern Backup Operation" dated Jun. 2011, 1 page.

Shilane et al. "Delta Compressed and Deduplicated Storage Using Stream-Informed Locality" dated 2012, 29 pages, EMC Corporation.

Moinakg's Ramblings "The Pseudo Random Bit Bucket—Scaling Deduplication in Pcompress—Petascale in RAM", dated Jun. 15, 2013, retrieved from https://moinakg.wordpress.com/tag/data-deduplication/ on Nov. 18, 2015, Blog at Wordpress.Com. The Twenty Twelve Theme.

Xia et al. "Combining Deduplication and Delta Compression to Achieve Low-Overhead Data Reduction on Backup Datasets" dated 2014, 2 pages, IEEE.org.

Anonymous "Data Deduplication Background: A Technical White Paper" dated Jul. 2014, 12 pages, White Paper Quantum Technical Bulletin TB00017.

Wikipedia "Logical Block Addressing" dated Dec. 3, 2016, 4 pages.

* cited by examiner

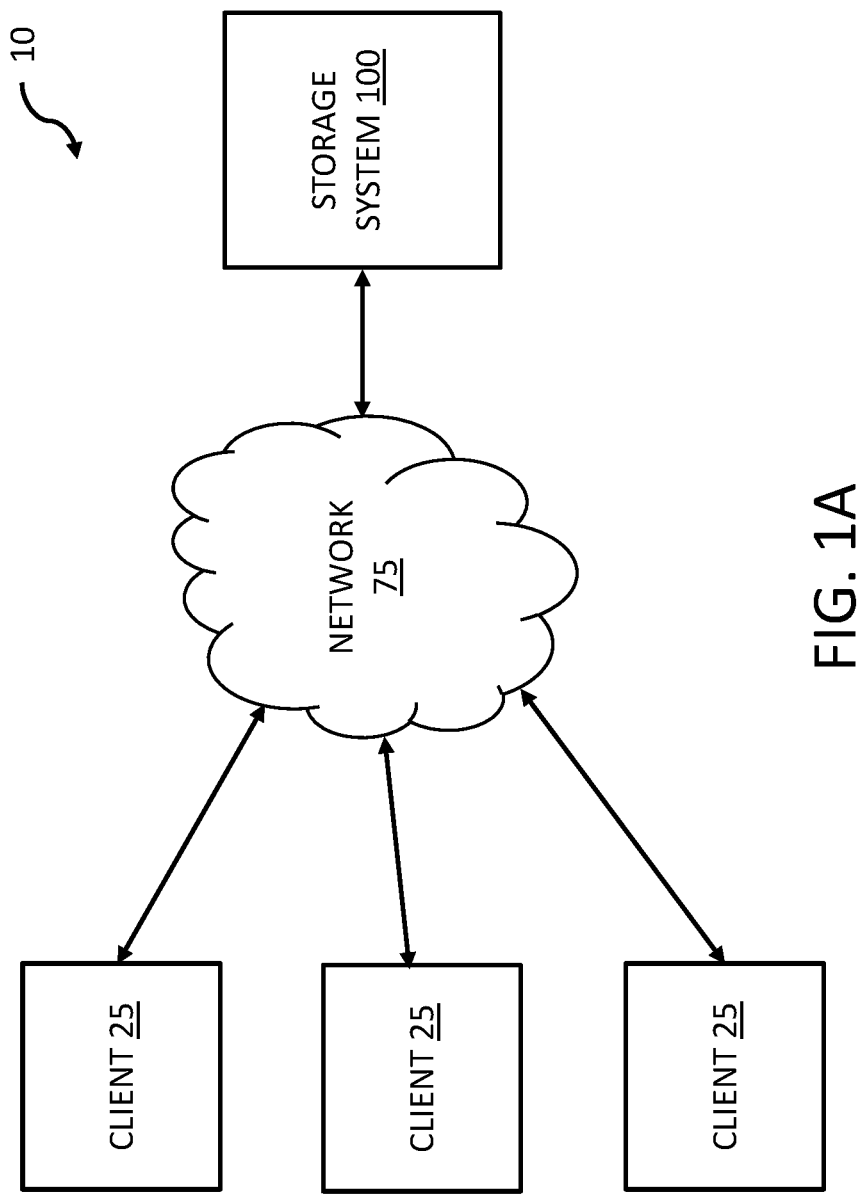

MANAGING DATA IN A STORAGE SYSTEM

BACKGROUND

Field of the Technology

The present disclosure relates to computing systems and, more particularly, to managing data in a storage system.

Description of Related Art

Various computing networks and systems are capable of storing data. In some previous storage networks and systems, multiple copies of the same data may be stored in the storage network and/or system. While it may be desirable to include a backup copy of some data to prevent data loss, storing multiple copies of the same data throughout a storage network and/or system can be an inefficient use of storage resources. For instance, storing multiple copies of the same data can unnecessarily consume valuable real estate in some storage systems, which may result in increased costs, latency issues, an effective decrease in memory capacity, etc., among other issues.

To reduce some inefficiencies, some storage networks and/or systems may use a data deduplication technique in an attempt to reduce the number of redundant copies of data. While some data deduplication techniques do reduce the number of redundant copies of data, these data deduplication techniques may not be a relative amount of to compensate for some of the inefficiencies experienced by some storage networks and/or systems.

For example, some data deduplication techniques used by some storage networks and/or systems may utilize an exact match algorithm to identify data in incoming data streams that match data already stored in the storage network and/or system. Some exact match algorithms may indeed reduce the number of redundant copies of stored data; however, they often only do so if incoming data and stored data are exactly the same, which may result in unnecessarily storing two pieces of substantially similar data (e.g., a one-off deviation of the data) because the two pieces of data may merely contain slight differences. Accordingly, some storage networks and/or systems can often store what amounts to, in effect, multiple copies of the same data without even recognizing and/or realizing that such unnecessary redundancies exist.

To identify data in a data stream that matches data already stored in the storage network and/or system, some data deduplication techniques utilize one or more reference blocks. A reference block may be a representation of data stored in a storage network and/or system. Incoming data blocks may be compared to the one or more reference blocks to determine if there is a match.

If there is a match, a pointer may be substituted in memory for the actual block of data or data block. A pointer may refer to an instance of the matched data that is already stored in memory. A pointer can be used in place of the matched data block and the data in the matched instance referenced by the pointer can be used in place of the matched data block when access to the data is needed or desired. Since a pointer may include a quantity of data that is less than the quantity of the actual data block itself, less memory space may be consumed by using a pointer as a de facto copy of the data compared to storing the actual data block as another copy of the data.

Inefficiency issues can further occur in some storage networks and/or systems when some reference blocks used to identify some copies of stored data in some incoming data streams may become outdated or may not provide a current representation of data being stored in a storage network and/or system. For instance, when some reference blocks become outdated or do not provide a current representation of some of the data being stored in the storage network and/or system, some redundant copies of the data already stored in the storage network and/or system may be needlessly retained since some reference blocks may not provide an accurate model for comparison purposes from which a match can be properly determined. Improperly determining that some new data does not match some existing data can result in that new data unnecessarily being stored in its entirety in the storage network and/or system. Thus, some prior storage networks and/or systems can experience inefficiency issues because they may not provide a technique for efficiently managing reference blocks.

In addition to updating reference blocks, another part of managing reference blocks that some prior storage networks and/or systems may lack is the ability to properly delete some outdated reference blocks. For instance, some reference blocks for comparison purposes may be stored in an area with limited storage space. At times, some reference blocks may become outdated and yet may remain in the area with limited storage space. As such, these outdated reference block may consume valuable space that could otherwise be used by more relevant or updated reference blocks that match data in an incoming data stream, which can prevent some relevant or updated data blocks from being used as a model for matching purposes because there may not be a sufficient amount of space to store them. Excluding one or more relevant or updated reference blocks for matching purposes can result in multiple copies of the same data being superfluously stored in some storage networks and/or systems.

Another inefficiency experienced by some prior storage networks and/or systems relates to managing the storage space consumed by newer and older data. In some Flash memories, for example, it may not be possible to write a block of memory multiple times without first erasing the entire block, which may be referred to as an erase block operation. Also, the physical nature of some Flash memories may only allow a limited number of erase block operations before a Flash memory may no longer able to write data. As such, it may be desirable to minimize the number of erase block operations to increase the lifespan of a Flash memory.

Storage issues can also arise when new data needs to be written to some storage networks and/or systems, but there may not enough contiguous space in memory to accommodate the new data without first performing an erase block operation. For example, useful older data may be sparsely distributed across memory that can result in multiple non-contiguous blocks of memory being spread across memory, which useful older data could be subject to an erase block operation to provide the space necessary to accommodate the new data. Thus, inefficiencies in some prior storage networks and/or system can result from balancing the desire to store new data, maintain useful older data, and minimize the number of erase block operations.

SUMMARY

Various aspects for managing data in a storage system are described. In an innovative aspect, a storage system may comprise, among other components, a non-volatile cache memory device including a buffer memory to store a comparison block library and a storage controller coupled to the cache memory device. The storage controller may include one or more processing devices for executing instructions in one or more applications configured to cause the storage controller to perform operations comprising selecting a first set of comparison blocks in the comparison block library to create an active set of comparison blocks and utilizing the active set in conjunction with a data deduplication technique. The operations may further comprise determining the occurrence of a predetermined event in the data deduplication technique, selecting a second set of comparison blocks in the comparison block library to create a new active set of comparison blocks in response to the predetermined event, replacing the active set with the new active set, and utilizing the new active set in conjunction with the data deduplication technique.

The operations for selecting the first set and the second set may include operations comprising calculating scores for comparison blocks in the comparison block library and selecting comparison blocks for inclusion in the first set and the second set based on the scores of the comparison blocks. Further, the operations for selecting the second set may comprise operations for carrying over at least one comparison block in the first set for inclusion in the second set. In addition, the operations for selecting the second set may further comprise operations for selecting at least one comparison block in the reference block library not included in the first set for inclusion in the second set.

The operations for selecting the second set further may comprise operations for dropping at least one comparison block in the first set from inclusion in the second set. Also, the operations for calculating the scores for comparison blocks may comprise operations for calculating a score based on at least one of a logical block count (LBN) factor, a recent-lookup factor, and a deduplication ratio factor. Some operations for calculating the score further include operations comprising providing a weighting factor to at least one of the LBN factor, the recent look-up factor, and the deduplication ratio factor.

The operations for selecting the second set may further comprise operations for selecting at least one comparison block in the comparison block library not included in the first set for inclusion in the second set. Some operations for determining the occurrence of the predetermined event may comprise operations for determining that a predetermined number of user data blocks have been written during the data deduplication technique.

In various embodiments, the non-volatile cache memory device may further include an auxiliary memory to store candidate comparison blocks. In some embodiments, the operations may further comprise receiving a data block for storage, comparing the data block and the comparison blocks in the buffer memory for a match, comparing the data block and the candidate comparison blocks in the auxiliary memory for a match, and responsive to the data block not matching any of the comparison blocks in the buffer memory and not matching any of the candidate comparison blocks in the auxiliary memory, adding the data block to the candidate comparison blocks in the auxiliary memory. Further, some operations for comparing may comprise operations for determining a match responsive to data in the data block matching at least a predetermined percentage of data in any comparison block or any candidate comparison block.

Various non-volatile cache memory devices may further include an auxiliary memory to store a plurality of candidate comparison blocks. Further, some operations may further comprise receiving a data block for storage, comparing the data block and the candidate comparison blocks in the auxiliary memory for a match, and responsive to the data block not matching any of the comparison blocks in the buffer memory but matching a candidate comparison block in the auxiliary memory, incrementing a counter associated with the candidate comparison block.

Some non-volatile cache memory devices may further include an auxiliary memory to store a plurality of candidate comparison blocks. Various operations may further comprise, responsive to a counter associated with a candidate comparison block exceeding a predetermined threshold count, promoting the candidate comparison block in the auxiliary memory to a comparison block in the buffer memory. Some operations may further comprise, responsive to a comparison block being no longer representative of a data block in the non-volatile memory system, removing the comparison block from the comparison block library.

In another innovative aspect, a method for managing data blocks in a non-volatile memory system may comprise storing, in a non-volatile cache memory device, a comparison block library, selecting a first set of comparison blocks in the comparison block library to create an active set of comparison blocks, and utilizing the active set in conjunction with a data deduplication technique. A method may further comprise determining an occurrence of a predetermined event in the data deduplication technique, selecting a second set of comparison blocks in the comparison block library to create a new active set of comparison blocks in response to the predetermined event, replacing the active set with the new active set, and utilizing the new active set in conjunction with the data deduplication technique. Some methods may further comprise selecting at least one comparison block in the active set for inclusion in the new active set, selecting at least one comparison block in the comparison block library not in the active set for inclusion in the new active set, and/or selecting at least one comparison block in the active set for inclusion in the new active set and at least one comparison block in the comparison block library not in the active set for inclusion in the new active set.

The method may further comprise storing, in an auxiliary database, candidate comparison blocks, receiving a data block for storage, comparing the data block and the comparison blocks in the non-volatile cache memory device for a match, comparing the data block and the candidate comparison blocks in the auxiliary database for a match, and responsive to the data block not matching any of the comparison blocks in the non-volatile cache memory device and not matching any of the candidate comparison blocks in the auxiliary database, adding the data block to the candidate comparison blocks in the auxiliary database. Further, the method may comprise, responsive to the data block not matching any of the comparison blocks in the non-volatile cache memory device and matching a candidate comparison block in the auxiliary database, incrementing a counter associated with the candidate comparison block and responsive to the counter reaching a predetermined threshold count, promoting the candidate comparison block to a reference block in the non-volatile cache memory device.

In various embodiments, a match may be determined responsive to data in the data block matching at least a relative percentage of data in a comparison block or a candidate comparison block, and a non-match may be determined responsive to data in the data block matching less than the relative percentage of data in a comparison block or a candidate comparison block. In some embodiments, a method may further include removing one or more comparison blocks from the comparison block library responsive to one or more comparison blocks being no longer representative of a data block in the non-volatile memory system.

In yet another innovative aspect, a system may comprise, among other components, a non-volatile cache memory device to store a comparison block library, means for selecting a first set of comparison blocks in the comparison block library to create an active set of comparison blocks, and means for utilizing the active set in conjunction with a data deduplication technique. The system may further comprise means for determining an occurrence of a predetermined event in the data deduplication technique, means for selecting a second set of comparison blocks in the comparison block library to create a new active set of comparison blocks in response to the predetermined event, means for replacing the active set with the new active set, and means for utilizing the new active set in conjunction with the data deduplication technique. Some embodiments may further comprise means for selecting at least one comparison block in the active set for inclusion in the new active set, means for selecting at least one comparison block in the comparison block library not in the active set for inclusion in the new active set, or means for selecting at least one comparison block in the active set for inclusion in the new active set and at least one comparison block in the comparison block library not in the active set for inclusion in the new active set.

In short, the various aspects disclosed herein provide technology for managing storage resources in a storage system. Some aspects provide technology for dynamically adapting comparison blocks to changing patterns of user data blocks in incoming data streams for use in conjunction with data deduplication techniques. Further, various aspects provide technology for managing the lifecycle of a comparison block via global garbage collection techniques. Further still, various aspects provide technology for managing the lifecycle of a reference block and/or a user data block via local garbage collection techniques. The various technologies included in the storage systems disclosed herein more efficiently and/or more effectively utilize storage resources than other storage systems.

The various embodiments disclosed herein include operations to overcome or at least reduce the issues in previous storage networks and/or systems discussed above and, accordingly, are more reliable and/or more efficient than previous computing networks and/or networks. For instance, the various embodiments disclosed herein include hardware and/or software with functionality to avoid or at least decrease the issues related to reliability and/or efficiencies associated with writing and/or storing data in a storage network and/or system. Thus, the embodiments disclosed therein provide various improvements to storage networks and/or storage systems.

It should be understood that language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

FIG. 1A is a diagram of an example computing network for storing data;

DETAILED DESCRIPTION

Figure 1B:
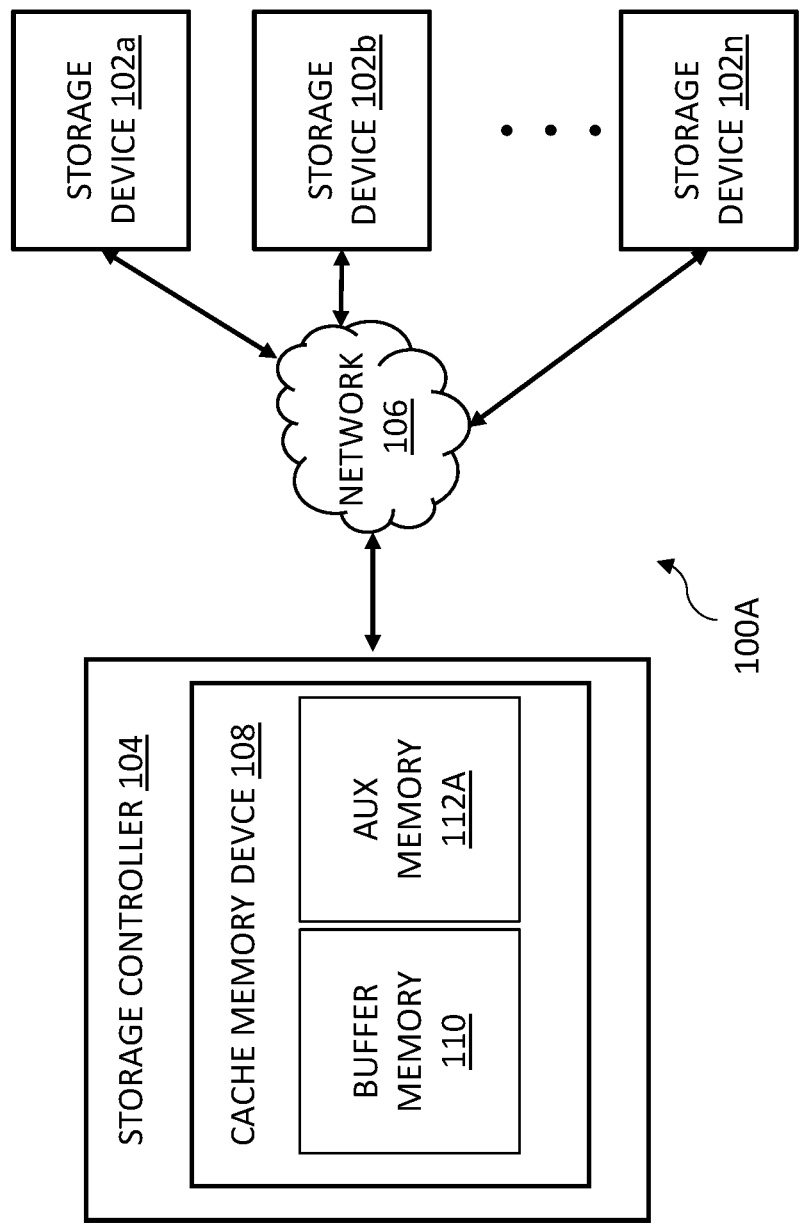
FIG. 1B is a diagram of an example storage system included in the example computing network of FIG. 1A.

The innovative technology disclosed herein includes various aspects, such as systems, methods, apparatuses, computer-readable media, computer program products, etc., for managing data in a storage system. By overcoming many of the inefficiencies experienced by previous systems, the systems, methods, apparatuses, computer-readable media, computer program products, etc. disclosed herein provide a variety of improvements over previous storage systems. The various embodiments disclosed herein can more efficiently and/or more effectively utilize storage resources in a storage system than other techniques. For instance, the various aspects disclosed below include hardware and/or software to advantageously utilize less storage space when storing data than other technologies.

With reference to the drawings, FIG. 1A is a block diagram of an example storage network 10. As shown, the storage network 10 can include, among other components, multiple client devices 25 capable of being coupled to and in communication with a storage system 100 via a wired and/or wireless network 75 (e.g., public and/or private computer networks in any number and/or configuration (e.g., the Internet, an intranet, a cloud network, etc.)). Other examples may include one client device 25 or two or more client devices 25 such that the various embodiments are not limited to three client devices 25.

A client device 25 can be any computing hardware and/or software (e.g., a thick client, a thin client, or hybrid thereof) that is known or developed in the future that is capable of accessing storage system 100 via network 75. A client device 25, as part of its respective operation, may rely on sending input/output (I/O) requests to storage system 100 to write data, read data, and/or modify data, etc. For instance, a client device 25 can transmit I/O requests to write, read, store, communicate, propagate, and/or transport instructions, data, computer programs, software, code, routines, etc., to storage system 100. Storage system 100 can be accessed by client device(s) 25 and/or communication with storage system 100 can be initiated by client device(s) 25 through a network socket (not shown) utilizing one or more inter-process networking techniques. In various embodiments, client device(s) 25 and storage system 100 may comprise at least a portion of a client-server model.

With reference to FIG. 1B, a block diagram of an example storage system 100A is illustrated. As shown, storage system 100A may comprise, among other components, multiple storage devices 102a, 102b, . . . 102n and a storage controller 104 coupled to and in communication with storage devices 102a, 102b, . . . 102n via a wired and/or wireless network 106.

In various embodiments, storage devices 102a, 102b, . . . 102n (also simply referred to individually, in various groups, or collectively, as storage device(s) 102) may be any type of storage device that is known or developed in the future and is capable of storing data. In various embodiments, a storage device 102 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device.

As shown in FIG. 1B, storage devices 102a, 102b, . . . 102n can be implemented as flash memory (e.g., a solid-state devices (SSD) or other non-volatile storage devices that store persistent data). Further, a storage device 102, in some embodiments, may include non-transitory memory such as, for example, a dynamic random access memory (DRAM) device, a static random access memory (SRAM) device, a hard disk drive (HDD), storage tape (e.g., magnetic and/or virtual), and/or other types (e.g., non-volatile and/or persistent) of memory devices, etc.

A storage device 102, in various embodiments, may include non-volatile/persistent hardware and/or software configured to perform long-term data storage operations, including, but not limited to, data archiving, data backup, data mirroring, replicating data, etc. For instance, a storage device 102 may include non-volatile and/or persistent hardware and/or software configured for performing long-term data storage operations, which may include write operations, read operations, read-write operations, etc., among other operations.

Further, a storage device 102 may include hardware and/or software to divide and/or partition its physical storage space into two or more smaller storage units that can be referred to herein as management units. An amount of space provided in one or more management units may be the same amount of space or at least two management units may include different amounts of storage space. Further, a management unit can include a structure to store data grouped together in blocks referred to herein as data blocks.

The data in some management units may be comprised of user data blocks and/or reference blocks. Since user data blocks and/or reference blocks can include different sizes, two or more management units may store different quantities of user data blocks and/or reference blocks.

A user data block can refer to a block of data received from a client device 25 for storage in one or more of storage devices 102. A user data block may comprise any type of computer-readable data that is known or developed in the future. The data in a user data block can be original data, compressed data, encrypted data, encoded data, and/or re-written data, etc., among other types of data that are possible and contemplated.

A user data block can be removed/deleted from a management unit. Further, a user data block, in various embodiments, can be relocated/moved from one location within a management unit to another location within the same management unit or to another location in a different management unit.

A reference block may be a block of data that includes a value (e.g., a pointer, an address, etc.) that refers to a user data block in a storage device 102 and/or in an incoming data stream including the same or substantially similar data. In addition, a reference block may be a synthesized data block that is not created directly from a user data block. For instance, a data block with all zeroes can be a synthesized reference block even if a data stream does not include a user data block with all zeroes.

A reference block can reduce the amount of memory space needed in a storage device 102 to store copies or substantially similar (e.g., within a standard deviation) copies of the same data. For example, when it may be desirable to access a copy of some data (e.g., a read request or operation), instead of accessing an actual copy of the data, a pointer in a reference block can be used in place of or as a substitution for the actual user data block by directing the read request to a user data block including the same or substantially similar data as the copy.

A reference block may include a smaller quantity of data than an actual user data block. Accordingly, because a reference block can serve as a de facto copy of a user data block, a reference block can allow memory space in a storage device 102 to be used more efficiently compared to storing an actual copy of the data block. As a non-limiting example, a reference block set may utilize 0.05% of available memory space.

In various embodiments, a reference block can be removed/deleted from a management unit. Further, a reference block, in some embodiments, may be relocated/moved from one location within a management unit to another location within the same management unit or within a different management.

In various embodiments, when a user data block is deleted, a reference block that refers to the user data block may also be deleted. Further, when a user data block is relocated, a reference block that refers to the user data block may be modified to include a new value (e.g., pointer, address, etc.) that corresponds to the new location of the user data block to which it points or refers.

In some embodiments, associated user data blocks and reference blocks may be stored in the same management unit. Further, associated user data blocks and reference blocks initially stored in the same management unit may be moved together to new respective locations within the same management unit or to new respective locations within the same new management unit.

As illustrated in FIG. 1B, storage controller 104 may include, among other components, a cache memory device 108. Cache memory device 108 may be any type of memory device (e.g., hardware and/or software) that is known or developed in the future and is capable of storing/buffering data for retrieval when an I/O request (e.g., write request, read request, and/or read-write request, etc.) is received at storage system 100A.

Figure 2:
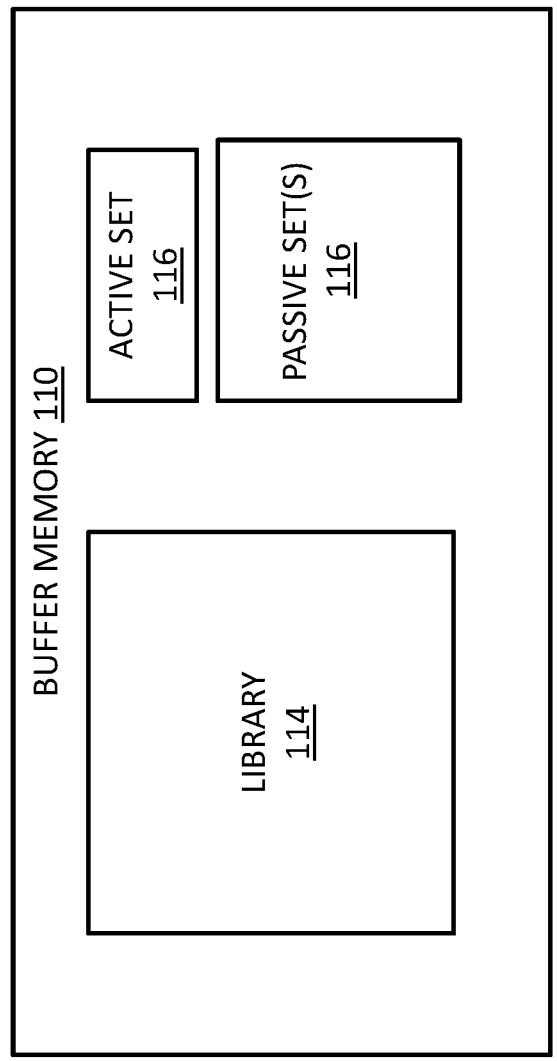
FIG. 2 is a block diagram of an example buffer memory included in some examples of a cache memory device illustrated in FIGS. 1B and 1C.

Cache memory device 108 may include, among other components, a buffer memory 110, and an auxiliary memory 112A. Buffer memory 110, as further illustrated in FIG. 2, may be any type of memory device that is known or developed in the future and is capable of storing/buffering data. In various embodiments, buffer memory 110 may include physical memory space to store one or more reference blocks that may be used to determine if one or more user data blocks already stored in storage devices 102 match one or more user data blocks in an incoming data stream.

To distinguish between a reference block in storage devices 102 that may point to a user data block in storage devices 102 and a reference block in buffer memory 110 that may be utilized to compare user data blocks in incoming data streams to user data blocks already stored in storage devices 102 for determining a match, a reference block in buffer memory 110 can also be referred to herein as a comparison data block. A comparison block can provide a representation (e.g., a hash value) of a user data block stored in storage device(s) 102 and/or in various incoming data streams and can be used as a model in determining a match.

In some embodiments, a plurality of comparison blocks in buffer memory 110 may be arranged into a library of comparison blocks 114 (or library 114). In various embodiments, a set of comparison blocks in library 114 may be selected to create one or more active sets of comparison blocks, which can be referred to hereafter as an active set 116. Further, a comparison block in one or more active sets 116 may be utilized to determine if/when a user data block in one or more incoming data streams match a user data block currently being stored in storage device(s) 102.

In some embodiments, buffer memory 110 may store one active set 116 at a time, which can include any quantity of comparison blocks. Some active sets can include about eighty percent (80%) of the total number of comparison blocks in buffer memory 110, although other percentages and/or quantities are possible and contemplated herein.

In various embodiments, an active set 116 can be selectively retired. Upon retirement, a retired active set 116 can be at least temporarily retained in buffer memory 110 and can be referred to herein as a passive set of comparison blocks 118 or a passive set 118.

In various embodiments, buffer memory 110 may store two or more passive sets 118 at any given time. In some embodiments, one or more passive sets 118 may be comprised of about twenty percent (20%) of the total number of comparison blocks in buffer memory 110, although other percentages and/or quantities are possible and contemplated herein.

A passive set 118 can be selectively deleted/removed from buffer memory 110 to free memory space in buffer memory 110. Memory space in buffer memory 110 may be freed-up to make space for a subsequent or new passive set 118. Further, one or more of the comparison blocks in a deleted/removed passive set 118 can be selectively deleted/removed from buffer memory 110 to free memory space in buffer memory 110 to free space for a subsequent or new comparison block in buffer memory 110 and/or library 114.

In various embodiments, one or more new comparison blocks can be added to library 114. For example, a new comparison block may comprise a candidate comparison block that is being promoted to buffer memory 110 from auxiliary memory 112A, as discussed elsewhere herein.

Figure 3A:
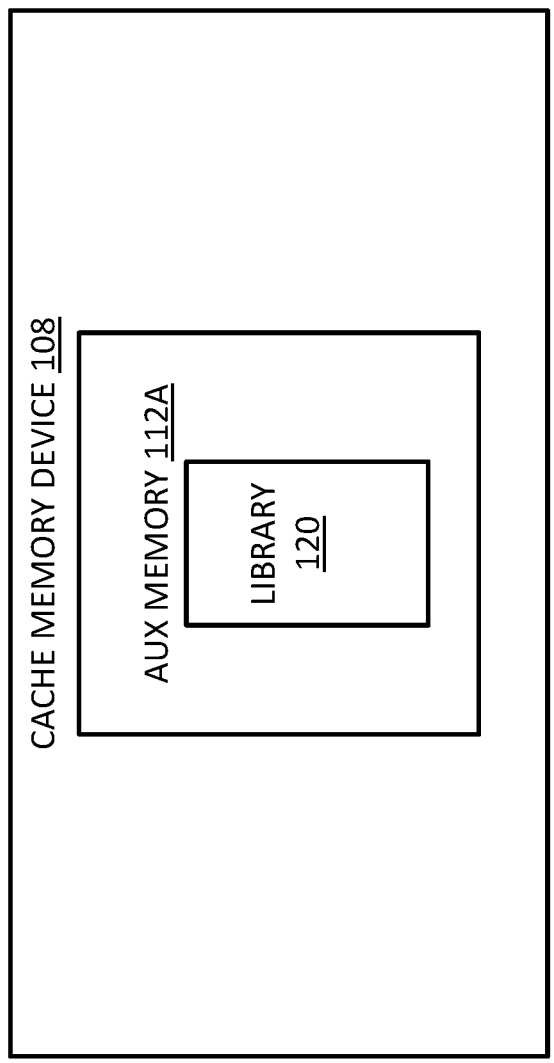
FIG. 3A is a block diagram of an example auxiliary memory included in some examples of a cache memory device illustrated in FIG. 1B.

Auxiliary memory 112, which is shown as auxiliary memory 112A in FIG. 3A, can be any hardware or combination of hardware/software that is capable of storing/buffering computer-readable data. In various embodiments, auxiliary memory 112A may include physical memory space to store one or more candidate comparison blocks, which can be arranged in a library of candidate comparison blocks 120 (or library 120).

A candidate comparison block can provide a representation (e.g., a hash value) of a user data block stored in storage device(s) 102 and/or in various incoming data streams and can be used as a model in determining a match. A candidate comparison can include the potential to be promoted to a comparison block in buffer memory 110.

In various embodiments, a candidate comparison block may be promoted to a comparison block in buffer memory 110 in response to detection of a predetermined event. Non-limiting examples of a predetermined event may include, but are not limited to, a threshold quantity of user data blocks in one or more incoming data streams matching a candidate comparison block or a threshold quantity of matches within a predetermined amount of time, etc., although other predetermined events are possible and contemplated herein.

A candidate comparison block in auxiliary memory 112A can be removed or demoted from auxiliary memory 112A. A candidate comparison block may be removed from auxiliary memory 112A in response to detecting an alternative predetermined event. Non-limiting examples of an alternative predetermined event may include, but are not limited to, less than a threshold quantity or relative quantity of user data blocks in one or more incoming data streams matching a candidate comparison block, expiration of a predetermined amount of time, or less than a threshold quantity or relative quantity of matches within a predetermined amount of time, etc., although other alternative predetermined events are possible and contemplated herein.

In various embodiments, storage controller 104 may include, among other components, hardware, and/or software to manage storage operations in storage system 100A. In some embodiments, storage controller 104 may at least partially manage data storage in storage system 100A utilizing one or more data deduplication techniques.

Various data deduplication techniques may compare the user data block(s) in an incoming data stream to the comparison block(s) in an active set 116 to determine if there may be a match. In some embodiments, storage controller 104 may determine a match when an incoming user data block and a comparison block match one another by greater than or equal to a threshold amount or relative amount. A threshold amount, in various embodiments, may be in the range of about 30% to about 100%, although other ranges, percentages, and/or quantities are possible and contemplated herein. In some embodiments, a threshold amount may be less than 100% or that a non-exact match can still be considered a match.

When there is a match, some data deduplication techniques may store a respective reference block in a storage device 102 in place of one or more matched incoming user data blocks. A reference block may include a pointer that points to a user data block already stored in storage devices 102 represented by the matched comparison block/candidate comparison block, as discussed elsewhere herein. In this manner, storage controller 104 may create one or more reference blocks in one or more management units of storage devices 102.

When there is not a match, storage controller 104 may store an incoming user data block, in its entirety, in storage devices 102. In this manner, storage controller 104 may store one or more user data blocks in one or more management units of storage devices 102. One or more user data blocks in the management units of storage devices 102 may have the potential to serve as a stored instance of data that can be pointed to by one or more reference blocks of one or more user data blocks that may be matched in the future.

In various embodiments, storage controller 104 may manage the comparison blocks in buffer memory 110 and library 114. Storage controller 104, in various embodiments, may select the set of comparison blocks in library 114 to function as an active set 116 of comparison blocks in buffer memory 110, as discussed elsewhere herein.

Selection of a comparison block for inclusion in some active sets 116 may be based on a calculated score for one or more comparison blocks. In some embodiments, storage controller 104 may select for inclusion in a next (or subsequent) active set 116 one or more comparison blocks that includes a score that is greater than or equal to a threshold amount or relative score, which may be any suitable score and/or value to relate one item to another.

A score for one or more comparison blocks may be calculated based on one or more metrics. Non-limiting examples of a metric may include, but are not limited to, a logical block count (LBN) factor, a recent-lookup factor, and/or a deduplication ratio factor, etc., although other metrics are possible and contemplated herein.

Some LBN factors count the quantity of reference blocks in storage devices 102 that point to a user data block represented by one or more comparison blocks. A comparison block with a high LBN factor may be desirable for inclusion in an active set 116 because an LBN factor can represent the quantity of user data blocks that are being served by the user data block that a particular comparison block represents. In various embodiments, the higher the quantity, the more desirable it may be to include a particular comparison block in an active set 116.

Some recent-lookup factors may measure the activity of one or more comparison blocks in terms of LBN increments occurring within a predetermined period of time, which can be any amount or quantity of time. Various recent-lookup factors may identify whether a comparison block is actively contributing towards deduplication of one or more incoming data streams. A higher recent-lookup factor or number can be an indication that a comparison block is actively contributing to an overall deduplication technique. In various embodiments, the higher the recent-lookup factor, the more desirable it may be to include a particular comparison block in an active set 116.

In various embodiments, the number of recent-lookup hits may not necessarily correspond to an LBN-count and vice-versa. For instance, a reference block with a high LBN-count may have a low number recent-lookup hits, which may indicate that the comparison block was once actively contributing towards overall deduplication, but may no longer doing so. A comparison block with a low LBN-count, but a high number recent-lookup hits may be an indication that a comparison block that is actively contributing towards serving hot data (e.g., workloads where the LBNs are frequently being overwritten). Accordingly, some embodiments may provide offsetting weightings for an LBN factor and/or a recent-lookup factor.

Various deduplication ratio factors may measure the overall reduction ratio achieved by one or more comparison blocks. In some embodiments, a deduplication ratio factor may be computed by taking into account the average space consumption savings achieved on one or more management units due to deduplication against one or more comparison blocks. A higher ratio may be an indication that a greater amount of storage space is being saved on storage devices 102 by using a particular comparison block and that it may be desirable to include this particular comparison block in the active set 116.

A calculated score based on an LBN factor or count, a recent-lookup factor, and/or a deduplication ratio factor can be an approximation of the amount of space that is being saved in storage devices 102 due to deduplication of the user data blocks in an incoming data stream against a particular comparison block. Further, the score may be helpful in determining the usefulness of a particular comparison block. It should be understood that equivalent values for evaluating lookup factors, scores, ratios, and weights, etc., may be used (e.g., inverted scales and ratios, other suitable values that provide similarly functionality, etc.) without departing from the scope of this disclosure.

In some embodiments, an LBN factor, a recent-lookup factor, and/or a deduplication ratio factor may be provided greater weight in comparison to one or more of the other metrics. For example, a recent-lookup factor may be given greater weight than an LBN count and a deduplication ratio in calculating a score for one or more comparison blocks, which may be true when data in incoming data streams is frequently changing. Greater weight may be given to an LBN count and/or a deduplication ratio factor in other possible scenarios that are contemplated herein.

Storage controller 104 may carry over one or more comparison blocks included in the current active set 116 to the next active set 116. In various embodiments, any quantity of comparison blocks in the current active set 116 may be carried to the next active set 116. In some embodiments, the quantity of blocks that may be carried over can be in the range of about 200 comparison blocks to about 400 comparison blocks, although other ranges and/or quantities are possible and contemplated herein.

In various embodiments, a comparison block may be carried over based on its score relative to a median score for the comparison blocks in an active set 116. For instance, when a score based on the above-referenced metrics is high enough for a comparison block in the current active set 116, the comparison block may be carried over for inclusion in the next active set 116.

In some embodiments, a comparison block in a current active 116 that includes a score that is greater than or relative to the median score may be carried over to the new active set 116. A score higher than a median score may be an indication that a comparison block is contributing to data deduplication and that it may be desirable to continue using this comparison block. In further embodiments, a comparison block with a score greater than about 80% of or relative to the median score may be carried over to the new active set 116, although other percentage and/or quantities are possible and contemplated herein.

Storage controller 104, in various embodiments, may promote one or more comparison blocks not included in the current active set 116 to the next active set 116. For instance, when a score based on the above-referenced metrics is high enough for a comparison block that is not included in the current active set 116, the comparison block may be included in the next active set 116. Accordingly, various embodiments of storage controller 104 may carry over one or more comparison blocks in the current active set 116 and promote one or more comparison blocks not included in the current active set 116 when selecting comparison blocks for inclusion in the next active set 116.

In various embodiments, the total number of comparison blocks that may be promoted may be about 20% of the total number of comparison blocks in buffer memory 110, although other percentages and/or quantities are possible and contemplated herein. In some embodiments, the total number of comparison blocks that may be promoted may be about 64 comparison blocks, although other quantities are possible and contemplated herein.

In some embodiments, storage controller 104 may demote or drop one or more comparison blocks in the current active set 116 from being included in the new active set 116. In further embodiments, storage controller 104 may uniformly spread any dropped comparison blocks across the passive sets 118 in buffer memory 110.

In various embodiments, a comparison block with a score that is not greater than or relative to the median score, as discussed elsewhere herein, may be dropped. In further embodiments, a comparison block with a score that is not greater than about 80% of or relative to the median score, as discussed elsewhere herein, may be dropped, although other percentage and/or quantities are possible and contemplated herein.

Comparison blocks that are too young or that were added too recently may not be considered for dropping in some embodiments. A comparison blocks may be considered too young if an insufficient amount of amount of time has passed to determine its usefulness as a comparison block. A comparison block that may be considered too young for dropping can be referred to herein as an immature comparison block.

In some embodiments, comparison blocks that have used for an amount of time to determine their usefulness as a comparison block, which can be referred to herein as one or more mature comparison blocks, may be listed by their individual scores in descending order. A median score for the comparison blocks may be calculated and a determination whether to carry over or drop a comparison block or a mature comparison block may be performed, as discussed elsewhere herein.

If a quantity of comparison blocks is not dropped from the active set 116 so that one or more new comparison blocks cannot be included in the next active set 116, some embodiments may drop one or more comparison blocks from the next active set 116. In some embodiments, comparison blocks may be dropped beginning at the bottom of the list until a quantity of comparison blocks equal to quantity of new comparison blocks may be dropped. In some embodiments, storage controller 104 may drop additional comparison blocks beginning with the comparison block with the lowest score and working upwards until a relative quantity of comparison blocks may be dropped. In further embodiments, immature comparison blocks may be excluded from being dropped by some techniques that begin dropping comparison blocks based on scores beginning from the bottom score and working up.

A comparison block remaining on the list or that was not dropped may be carried over for inclusion in the new active set 116. For instance, the number of slots freed up in the new active set 116 (e.g., 20% of the total number of comparison blocks in buffer memory 110, among other example percentages and/or quantities) may be filled by promoted comparison blocks and/or candidate comparison blocks, as discussed elsewhere herein. Further, when switching out of active sets 116, the quantity of new comparison blocks that can be promoted to the new active set 116 may be the same or substantially the same (e.g., with 10%) quantity as the number of comparison blocks that are dropped from the previous active set 116, which may keep the quantity of comparison blocks in the active sets 116 confined to a range.

Subsequent to creating a new active set 116, storage controller 104 may replace the current active set 116 with the new active set 116, which operations can also be referred to herein as switching in as switching or switching out active sets 116. In various embodiments, storage controller 104 may use the new active set 116 in conjunction with the one or more data deduplication techniques in a manner similar to the previous active set 116.

In some embodiments, storage controller 104 may switch out active sets 116 or retire an active set 116 upon the occurrence of a predetermined event. Non-limiting examples of a predetermined event may include, but are not limited to, the expiration of a predetermined amount or quantity of time (e.g., about ten minutes, among other example quantities of time), receipt of a threshold amount or quantity of user data blocks from client device(s) 25, a predetermined quantity of hits/matches of one or more comparison blocks in library 114 that are not included in the current active set 116, a predetermined quantity of hits/matches of one or more comparison blocks in library 114 that are not included in the current active set 116 within a predetermined amount of time, and/or less than or equal to a predetermined number or relative number of hits/matches of one or more comparison blocks in the current active set 116 within a predetermined amount of time, etc., although other events are possible and contemplated herein.

In various embodiments, storage controller 104 may further maintain one or more active sets 116 in buffer memory 110 as passive set(s) 118 upon retirement. In some embodiments, storage controller 104 may increment and/or decrement a counter associated with a comparison block in a passive set 118 based on various events. For instance, a counter for a comparison block may be incremented when a new reference block points/refers to a user data block represented by the comparison block. Further, a counter for a comparison block may be decremented upon the occurrence of a predetermined event. Non-limiting examples of a predetermined event that may decrement a counter may include, but are not limited to, a situation in which one or more of the user data blocks represented by a comparison block in a particular passive set 118 is deleted from storage devices 102, deleted from cache memory device 108, is written over by new data (e.g., a new user data block), a situation in which one or more comparison blocks in a particular passive set 118 no longer represent a valid or current user data block etc., although other events are possible and contemplated herein.

Storage controller 104, in various embodiments, may delete and/or demote one or more comparison blocks from buffer memory 110. In some embodiments, storage controller 104 may delete one or more comparison blocks in buffer memory 110 that have been decremented to zero and/or include a counter with a zero count. In further embodiments, storage controller 104 may delete one or more comparison blocks in buffer memory 110 that is not included in any active set 116 and/or any passive set 118. Storage controller 104 may delete a comparison block upon deletion of a passive set 118 including the comparison block, which may be the deletion of a lone passive set or a final passive set including the comparison block.

In some embodiments, storage controller 104 may delete one or more passive sets 118 from buffer memory 110. A passive set 118 may be deleted when a respective counter associated with one or more comparison blocks in the passive set 118 is decremented to zero or includes a zero count. For instance, a passive 118 may be deleted from buffer memory 110 when a counter associated with a final or last remaining comparison block in the passive set 118 is decremented to zero and/or the counter includes a zero count.

Further, a passive set 118 may be deleted when the passive set 118 includes less than a predetermined quantity of comparison blocks, which can be any quantity of comparison blocks. In some embodiments, prior to deletion of a passive set 118, each comparison block in the passive set 118 may be removed from the passive set 118 and/or relocated to another passive set 118 in buffer memory 110.

In various embodiments, the deletion of one or more comparison blocks from library 114, the deletion of one or more comparison blocks from buffer memory 110, and/or the deletion of one or more passive sets 118 from buffer memory 110 may be considered at least a portion of some global garbage collection techniques. Some global garbage collection techniques may free storage space in buffer memory 110 so that more relevant and/or updated comparison blocks and/or comparison sets (e.g., active sets 116 and/or passive sets 118) may be added to and/or created in buffer memory 110. Some global garbage collection techniques may free storage space in buffer memory 110 by deleting/removing less relevant and/or outdated comparison blocks and/or comparison sets from buffer memory 110.

For a variety of reasons, it is possible that the amount of storage space in buffer memory 110 that is available for storing comparison blocks and/or comparison sets may go below a predetermined or threshold amount or may even go to zero. In some embodiments, a threshold value that triggers a global garbage collection technique may be eighty percent (80%) of the available space in buffer memory 110 for storing comparison blocks and/or comparison sets, although other percentages and/or quantities are possible and contemplated herein. In some embodiments, a threshold amount that can trigger a global garbage collection technique may be any percentage and/or quantity that maintains some amount of storage space that is less than 100% to provide an amount of reserve storage space to account for various scenarios in which extra storage space may be consumed.

Various global garbage collection techniques may be based on incoming data streams overwriting the existing user data blocks in storage devices 102 in a uniformly random order. In some embodiments, some oldest user data blocks, which can be represented by the oldest passive sets 118, may have encountered more overwrites than some newer user data blocks, which makes the older user data blocks better candidates for garbage collection. As such, as some local garbage collection techniques relocate older user data blocks first, user data blocks represented by comparison blocks in older passive sets 118 may end up being automatically relocated. By the time a local garbage collection technique attempts to relocate newer user data blocks and/or while newer passive sets 118 are being created, some of the older comparison blocks in older passive sets 118 may have been deleted because there are no more user data blocks in storage devices 102 being represented by these older comparison blocks. As such, some global garbage collection techniques and some local garbage collection techniques may be considered portions of the same garbage collection technique.

It is possible in some situations that buffer memory 110 may no longer be able to accommodate any additional comparison blocks. For these unlikely situations, storage controller 104 may provide a forced garbage collection technique to delete/remove one or more passive sets 118 and/or one or more comparison blocks in buffer memory 110 to free up space or create available storage space in buffer memory 110.

In some embodiments, storage controller 104 may assign one or more active sets 116 and/or passive sets 118 (e.g., individually or collectively can be referred to as a comparison set) a sequence number that can be used to identify an order in time in which a comparison set was used as an active set 116. In some aspects, the higher the sequence number, the later it was used, although other sequencing techniques are possible and contemplated herein. The sequencing information can be used to find the number of user data blocks that were represented by a particular comparison set.

In some forced garbage collection techniques, a passive set 118 with the lowest sequence number (e.g., the oldest passive set) may be identified and deleted from buffer memory 110 to free storage space in buffer memory 110. In some aspects, the oldest passive set 118 may be selected because it is likely to include the fewest number of comparison blocks representing user data blocks currently being pointed to a reference block. In various aspects, the immediately next higher sequence-numbered passive set 118 may be identified and deleted when at least one more passive set 118 is selected for deletion to free up a relative amount of storage space in buffer memory 110.

In addition, various aspect may calculate the range of user data blocks in storage devices 102 represented by the deleted passive set(s) 118 and one or more user data blocks in the range may be deleted. Further, the process of periodically checking whether it may be desirable to repeat the forced passive set deletion technique may be repeated. In some aspects, periodic checks may be performed by keeping track of the number of free slots available for storing passive sets 118 in buffer memory 110.

It is possible that, in the event that the above forced passive set deletion situation is detected, a local garbage collection technique over the user data blocks in storage devices 102 is also currently/simultaneously in progress. In this situation, performing both the local garbage collection technique and the forced garbage collection technique of the comparison sets are important. In some embodiments, a local garbage collection technique may be assigned a higher priority than a forced garbage technique because the local garbage collection technique can directly affect the ability of storage controller 104 and storage devices 102 to continue storing user data blocks. In other words, a forced garbage collection technique may be utilized to make storage system 100A more efficient, but storage system 100A may be able to continue running, albeit less efficiently, without implementing a forced garbage collection technique.

In various embodiments, storage controller 104 may allow a forced garbage collection technique to run unthrottled when a local garbage collection technique is not being performed, which can allow one or more comparison sets in buffer memory 110 to be deleted/removed from buffer memory 110 at an earlier time or an earliest possible time to free up or make available storage space in buffer memory to store comparison blocks. Further, storage controller 104 may throttle or operate at a reduced rate a forced garbage collection technique on comparison blocks in buffer memory 110 when a local garbage collection technique is being performed, which can reduce and/or minimize the impact of the forced garbage technique on the local garbage technique and yet provide progress towards freeing up of storage space for additional comparison sets and/or comparison blocks in buffer memory 110.

Storage controller 104, in various embodiments, may add one or more comparison blocks to the library 114. In some embodiments, an added comparison block may be a candidate comparison block promoted from auxiliary memory 112A.

In various embodiments, storage controller 104 may manage the candidate comparison blocks in auxiliary memory 112A and may further create library 120. Storage controller 104, in various embodiments, may further promote one or more candidate comparison blocks in auxiliary memory 112A to a comparison block in buffer memory 110.

In some embodiments, storage controller 104 may provide a counter associated with one or more candidate comparison blocks. Storage controller 104 may further increment an associated counter when a user data block in an incoming data streams hits or matches a particular candidate comparison block. Further, storage controller 104 may determine an age of one or more candidate comparison blocks, which may be determined by, for example, a time stamp, among other examples.

In various embodiments, storage controller 104 may promote a candidate comparison block to a reference block in buffer memory 110. In some aspects, a candidate comparison block may be promoted when/if a counter associated with a candidate comparison block is incremented to a threshold quantity within a predetermined amount of time, which may be any quantity within any amount of time. In various aspects, some candidate comparison blocks may be promoted based on a calculation of the number of hits, an age metric, and/or other metrics, etc., although other metrics are possible and contemplated herein.

In various embodiments, storage controller 104 may determine whether a new candidate comparison block can be added to auxiliary memory 112A. Storage controller 104 may compare one or more user data blocks in an incoming data stream to the comparison blocks in buffer memory 110 and to the candidate comparison blocks in auxiliary memory 112A. In various embodiments, storage controller 104 may create or generate a new candidate comparison block in auxiliary memory 112A that represents a user data block in an incoming data streams when a user data block does not match any of the comparison blocks in buffer memory 110 and does not match any of the candidate comparison blocks in auxiliary memory 112A. A new candidate comparison block may further be added to library 120 in auxiliary memory 112A.

Storage controller 104, in various embodiments, may remove or delete a candidate comparison block from auxiliary memory 112A. In some embodiments, a candidate comparison block may be removed in response to a predetermined event. Non-limiting examples of a predetermined event may include, but is not limited to, auxiliary memory 112A having less than a predetermined threshold amount or relative amount of available storage space, a candidate comparison block with a counter that is not incremented to a predetermined quantity within a predetermined amount of time, and/or a candidate comparison block that has aged beyond a predetermined threshold age, etc., although other events are possible and contemplated herein.

In some embodiments, if attempts to identify candidate comparison blocks for deletion do not free up a sufficient amount of storage space in auxiliary memory 112A to reduce the consumption of storage space below a predetermined threshold amount, storage controller 104 may more aggressively remove one or more candidate comparison blocks. A non-limiting example of more aggressively removing one or more candidate comparison blocks may include, but is not limited to, reducing the age threshold and deleting candidate comparison block(s) that are less than or equal to the reduced or relative age, among other possible examples that are contemplated herein. Reducing the threshold age can be repeated until a relative amount (e.g., sufficient amount) of storage space is made available in auxiliary memory 112A and/or may be performed a predetermined number of times, which may be any quantity. In some embodiments, the reduction of age threshold may include deleting candidate comparison blocks that have aged beyond the lower age threshold, even if they are otherwise promotable. More aggressively removing one or more candidate comparison blocks may further include deleting immature candidate comparison blocks that do not include a high enough calculated score to be promotable.

In the unlikely event that the more aggressive removal operations do not free up a relative (e.g., sufficient, needed, desired, etc.) amount of space in auxiliary memory 112A, storage controller 104 may cease the deletion operations and reschedule resumption of the deletion operations at a later time, which may include a time when one or more immature candidate comparison blocks may become mature candidate comparison blocks. For instance, in the time from the cessation of deletion operations to the resumption of deletion operations in auxiliary memory 112A, an attempt to add new candidate comparison blocks to auxiliary memory 112A may fail or may not be otherwise attempted, as applicable.

In various embodiments, deletion of one or more candidate comparison blocks from auxiliary memory 112A may be considered at least a portion of a global garbage collection technique. In some global garbage collection techniques, storage space in auxiliary memory 112A may be freed so that more relevant and/or updated candidate comparison blocks may be added to auxiliary memory 112A. Various global garbage collection techniques may free storage space in buffer memory 110 by removing less relevant and/or outdated candidate comparison blocks from auxiliary memory 112A.

Storage controller 104, in various embodiments, may manage data storage on storage devices 102. In some embodiments, storage controller 104 may divide the storage space in storage devices 102 into management units and may further write user data blocks and/or reference blocks to the management units, as discussed elsewhere herein.

In some embodiments, storage controller 104 may determine if/when it may be desirable to free space in one or more of storage devices 102 and/or one or more management units. For example, storage controller 104 can determine that an incoming data stream may consume a certain quantity of memory space in a storage device 102 and that there is not a sufficient amount of contiguous data space in any one management unit to accommodate the incoming data stream, which may trigger a desire to free storage space in a management unit to create a corresponding amount of contiguous free data space so that the incoming data stream may be accommodated.

In various embodiments, storage controller 104 may further implement a local garbage collection technique to assist in freeing up storage space in a storage device 102. Storage controller 104 may utilize some local garbage collection techniques to more efficiently utilize storage space in storage devices 102 by relocating data blocks stored in the management units to other locations when/if there may be a desire to free storage space in a management unit, as discussed elsewhere herein.

A local garbage collection technique, in various embodiments, may include a counter associated with management units (one or more, each, etc.) in storage devices 102 and may utilize a counter to track a quantity of valid user data blocks in its associated management unit. In various embodiments, a valid user data block can be a user data block that includes the data originally written to a management unit or data in a management unit that has not been over-written with new data.

In some embodiments, storage controller 104 may utilize the counters associated with the management unit(s) to select a victim management unit, which can be a management unit within which it may be desirable to free data space. A victim management unit may be selected based on the quantity of valid user data blocks in one or more management units, as tracked by the counters. In some embodiments, storage controller 104 may select the management unit with the fewest number or quantity of valid user data blocks as a victim management unit. For instance, storage controller 104 may select the management unit with an associated counter including the lowest count value as the victim management unit.

Storage controller 104, in various embodiments, may relocate one or more valid user data blocks in the victim management unit. In some embodiments, storage controller 104 may read a valid user data block in a victim management unit to cache memory device 108 and subsequently write the valid user data block to a new location in storage devices 102. Some valid user data blocks that are adjacent, temporally close, or proximate to one another in a victim management unit may be written/re-written to new locations in the same management unit, while other valid user data blocks may be written/re-written to new locations in a different management unit. A new location for some valid user data blocks written/re-written to the same management unit that the valid user data block(s) were read from (e.g., the victim management unit) may be selected so that a sufficient amount of contiguous storage space in the victim management unit is freed up to accommodate one or more, each, etc., of the user data blocks in an incoming data stream.

In some embodiments, storage controller 104 may read and write/re-write one or more valid user data blocks utilizing a Moved-Compressed technique. Some Moved-Compressed techniques may include operations that perform raw or basic read operations to read compressed user data blocks in the management units to cache memory device 108 followed by operations that perform raw or basic write operations to write the compressed user data blocks from cache memory device 108 back to a management unit in storage devices 102. Various Moved-Compressed techniques can be implemented in conjunction with a data deduplication technique if/when one or more of compressed user data blocks being relocated is/are a reference block that relies on a user data block that continues to be available in cache memory device 108 and/or storage devices 102.

Storage controller 104, in some embodiments, may read and write/re-write one or more valid user data blocks utilizing a Compression-as-part-of-Relocation technique. Some Compression-as-part-of-Relocation techniques may include operations that initially write one or more user data blocks to the management units in storage devices 102 in an uncompressed form. Subsequently, a local garbage collection technique consistent with the various embodiments discussed above may be performed to free storage space in a victim management unit (e.g., reduce the quantity of data in the victim management unit and/or create a larger amount of contiguous storage space in the victim management unit). Various Compression-as-part-of-Relocation techniques may further include operations to read one or more valid user data block, which are in uncompressed form, in the victim block to cache memory device 108 (e.g., buffer memory 110), compress one or more valid data blocks to create a respective compressed user data block, and write one or more compressed user data blocks to a new location in storage devices 102 (e.g., a write/re-write to the victim management unit or to a different management unit). In various embodiments, the Compression-as-part-of-Relocation technique can improve the visible latency for a user of storage system 100A because the local garbage collection technique may be a background process.

In various embodiments, storage controller 104 may read and write/re-write one or more valid data blocks utilizing a Re-encode technique, which can also be referred to as a Re-compress technique and/or a Re-deduplication technique. Some Re-encode techniques may include operations that reads one or more compressed valid user data blocks to cache memory device 108 (e.g., buffer memory 110) and decompresses one or more of the compressed valid user data blocks, which can be considered part of the read operations or separate operations, to create one or more decompressed valid user data blocks in cache memory device 108. Moreover, various Re-encode techniques may include operations that compress (e.g., re-compress) one or more of the decompressed valid user data blocks in cache memory device 108 and operations to perform write operations to write the re-compressed valid user data blocks to the management units in storage devices 102. In some embodiments, the operations to re-compress the decompressed valid user data blocks can be considered part of the write operations, while in other embodiments the operations to re-compress the decompressed valid user data blocks may be considered separate operations. Some Re-compress techniques allow for multiple-use cases, some examples of which are discussed below, among other example multiple-use cases.

Some Re-encode techniques may utilize Recompress-With-Different-Algorithm operations when relocating valid user data blocks. In various embodiments, two or more different compression algorithms may be used to compress user data blocks when the user data blocks are written to storage devices 102. In some embodiments, a first compression technique that provides faster compression of the user data blocks and a second compression technique that provides a better compression factor may be utilized. In some aspects, a faster compression technique may be utilized to compress the user data blocks when the user data blocks are initially written to storage devices 102 to provide better latency and subsequently the user data blocks are decompressed and then re-compressed using a compression technique with a better compression factor during a local garbage collection technique to improve the compression ratio of the user data blocks in storage devices 102.

Since some data deduplication techniques may perform more effectively when a larger amount of data is used for compression because larger amounts of data can provide a greater number of available patterns of user data blocks, some Re-encode techniques may utilize Recompress-With-Additional-Data operations when relocating valid user data blocks. In some aspects, one or more additional data blocks may be added to the quantity of user data blocks during a compression algorithm. In various aspects, multiple logically-consecutive user data blocks may be included with a local garbage collection technique to improve the compression ratio of the data stored in storage devices 102.

Utilizing some Re-encode techniques as part of a relocation write operation can provide various benefits. In various Re-encode techniques, it is possible that a more accurate active set 116 may be available at the time of a relocation write, which can provide improved reduction ratios in storage devices 102. In some Re-encode techniques, a re-encoding step may refer to a new active set 116, which can diminish a desire to store one or more passive sets 118 in buffer memory 110 and may allow for a natural evolution of active sets 116 and/or may help remove one or more passive sets 118 from buffer memory 110.

By utilizing network 106, storage system 100A, in various embodiments, can comprise a cloud network (IAN), a SAN (e.g., a storage area network, a small area network, a server area network, and/or a system area network), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/or or sets of computing devices connected together for the purpose of sharing resources.

Figure 1C:
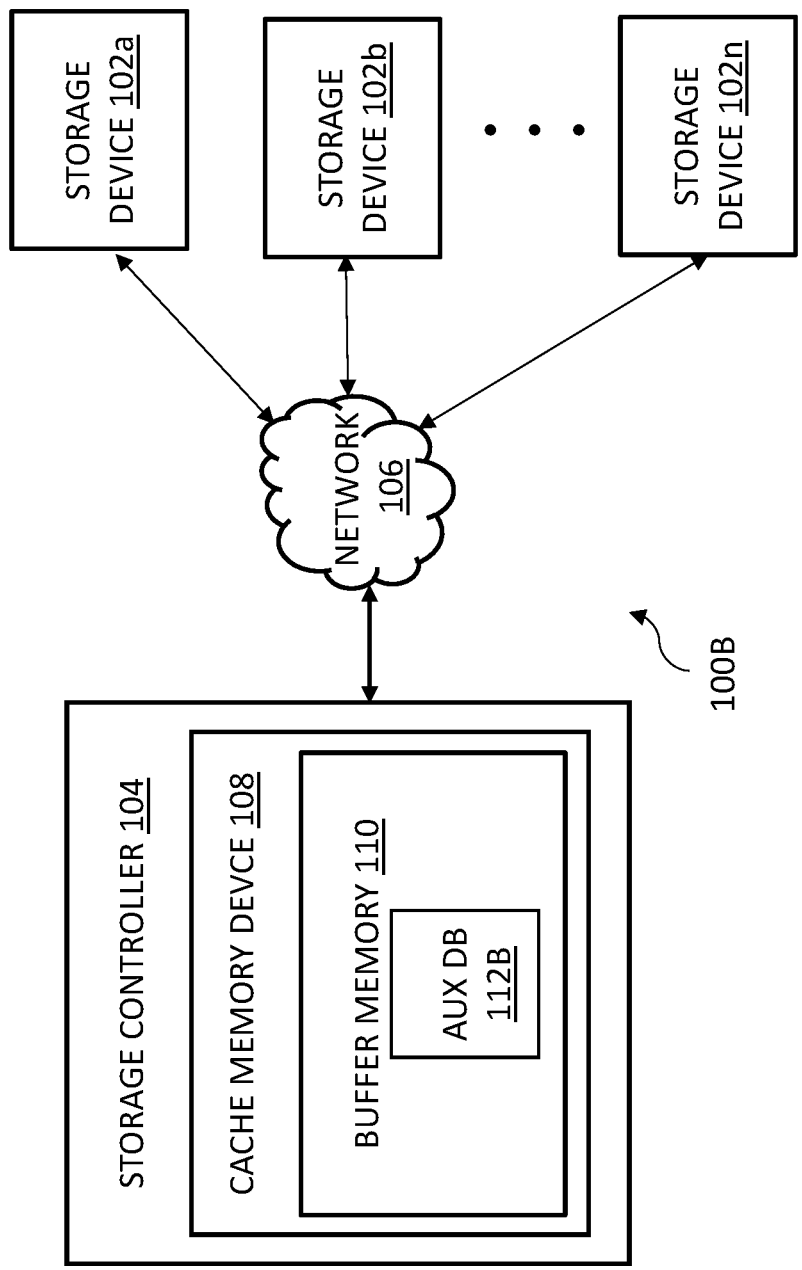
FIG. 1C is a diagram of an example storage system included in the example computing network of FIG. 1A.

With reference now to FIG. 1C, a block diagram of an example storage system 100B is illustrated. At least in the illustrated embodiment, storage system 100B may comprise, among other components, multiple storage devices 102a, 102b, ... 102n and a storage controller 104 coupled to and in communication with storage devices 102a, 102b, ... 102n via a wired and/or wireless network 106 similar to various embodiments of storage system 100A discussed above. Further, the storage controller 104 in storage system 100B may comprise, among other components, a cache memory device 108 including a buffer memory 110 similar to various embodiments of storage system 100A, as discussed elsewhere herein.

Figure 3B:
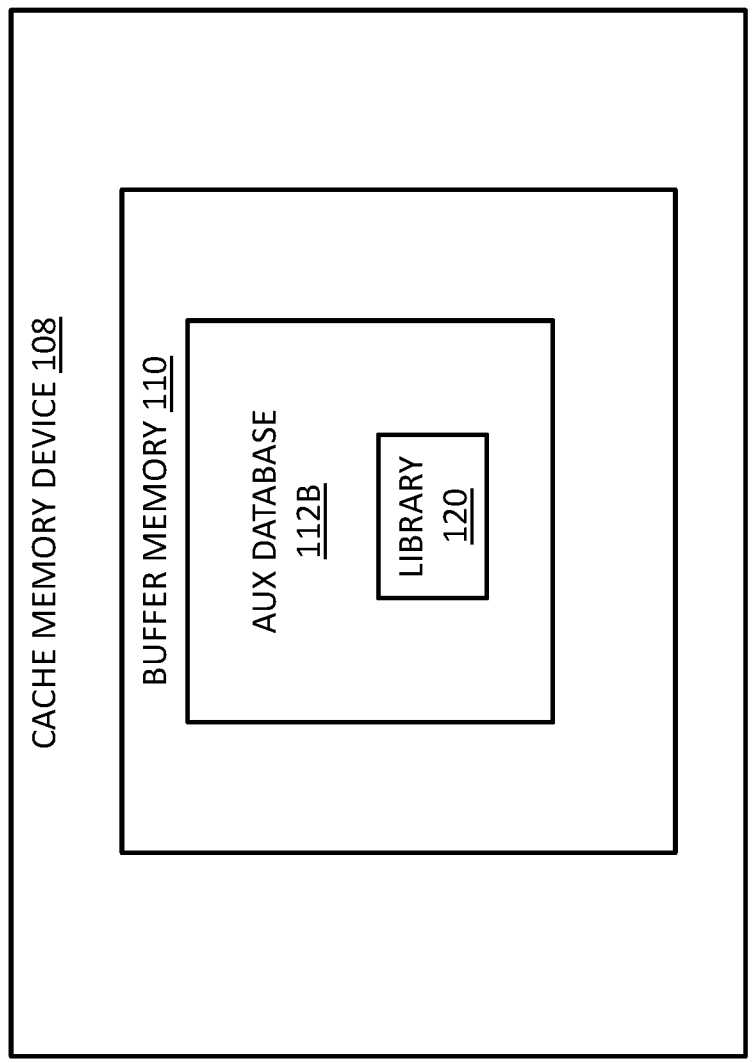
FIG. 3B is a block diagram of an example auxiliary database included in some examples of a cache memory device illustrated in FIG. 1C.

As shown in FIG. 3B, at least one difference between storage system 100B and storage system 100A may be the inclusion of an auxiliary database 112B in buffer memory 110 of storage system 100B in place of an auxiliary memory 112A in the cache memory device 108 of storage system 100A. Auxiliary database 112B can be any software capable of storing computer-readable data. In various embodiments, auxiliary database 112B may include physical memory space to store one or more candidate comparison blocks organized in a library of candidate comparison blocks 120. In various embodiments, auxiliary database 112B may function similar to various embodiments of auxiliary memory 112A, as discussed elsewhere herein.

In some embodiments, the various components included in storage system 100B may perform operations similar to corresponding components in storage system 100A. For instance, storage device(s) 102, storage controller 104, network 106, cache memory device 108, and buffer memory 110 in storage system 100B may include hardware and/or software to perform operations similar to storage device(s) 102, storage controller 104, network 106, cache memory device 108, and buffer memory 110, respectively, in storage system 100A.

Some embodiments of auxiliary database 112B may perform operations similar to various embodiments of auxiliary memory 112A, except that auxiliary database 112B may be entirely comprised of software, whereas some embodiments of auxiliary memory 112A may include hardware or a combination of hardware/software to perform its various operations.

Figure 3C:
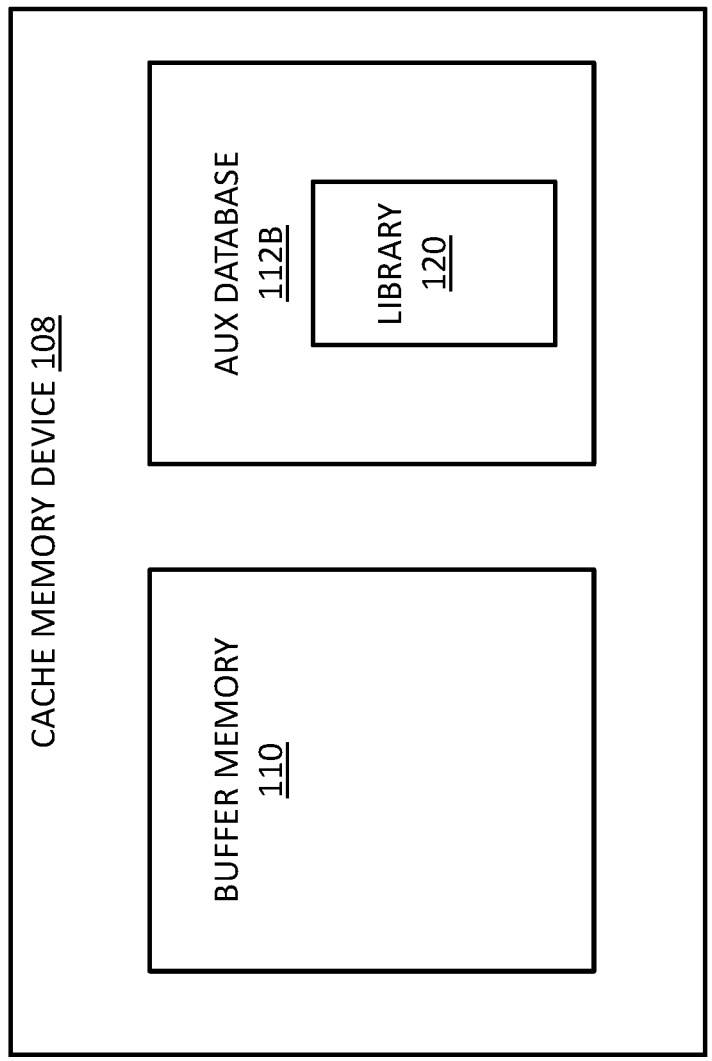
FIG. 3C is a block diagram of an example auxiliary database included in some examples of a cache memory device illustrated in FIG. 1C.

As shown in FIG. 3C, some auxiliary databases 112B may be included in the cache memory device 108 of storage system 100B. For instance, auxiliary database 112B may not be stored in the buffer memory 110 of storage system 100B because it can be stored in a different storage area of the cache memory device 108.

Figure 4:
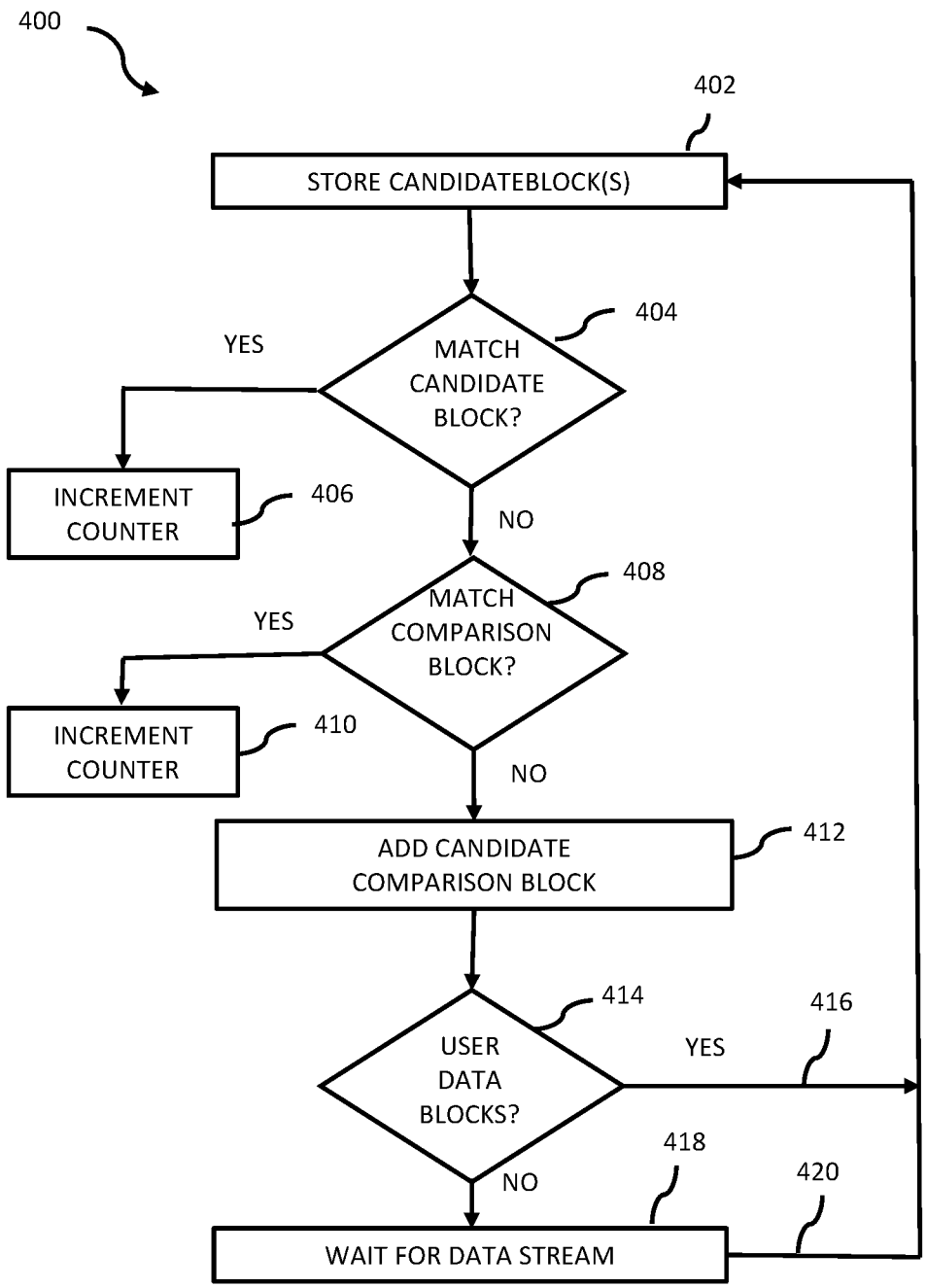
FIG. 4 is a flow diagram of an example method for managing candidate comparison blocks in a storage system.

FIG. 4 is a flow diagram of an example method 400 for managing candidate comparison blocks in a storage system 100, storage system 100A, and/or storage system 100B. As shown, some embodiments of method 400 may begin by storing one or more candidate comparison blocks (block 402), which can comprise a library 120 of candidate comparison blocks. In some embodiments, the candidate comparison block(s) and/or library 120 may be stored in an auxiliary memory 112A and/or an auxiliary database 112B.

A user data block in an incoming data stream may be compared to one or more candidate comparison blocks to determine if the user data block matches one or more of the candidate comparison blocks (block 404). If/when there is a match (e.g., a YES in block 404), a counter associated with the matched candidate comparison block may be incremented (block 406). If/when there is not a match (e.g., a NO in block 404), the user data block in the incoming data stream may be compared to one or more comparison blocks in a buffer memory 110 to determine if there is a match (block 408). A match may be determined if/when the data in the incoming user data block matches a threshold amount of data in a candidate comparison block, as discussed elsewhere herein.

If/when there is a match between the incoming data block and a comparison block in the buffer memory 110 (e.g., a YES in block 408), a counter associated with the matched comparison block may be incremented (block 410). If/when there is not a match (e.g., a NO in block 408), a new candidate comparison block may be added to or created in the cache memory device 112A/112B (block 412). A match may be determined if/when the data in the incoming user data block matches a threshold amount of data in a comparison block, as discussed elsewhere herein.

In various embodiments, method 400 may further include determining if any incoming data blocks desiring comparison remain in the incoming data stream (block 414). If/when there are one or more user data blocks remaining in the incoming data stream (e.g., a YES in block 414), blocks 404 through 414 may be repeated for one or more remaining incoming data blocks (return 416). If/when there are no remaining user data blocks in the incoming data stream (e.g., a NO in block 414), method 400 may include waiting for a next or subsequent incoming data stream (block 418) and may further repeat blocks 404 through 418 for one or more subsequent incoming data streams (return 420).

Figure 5:
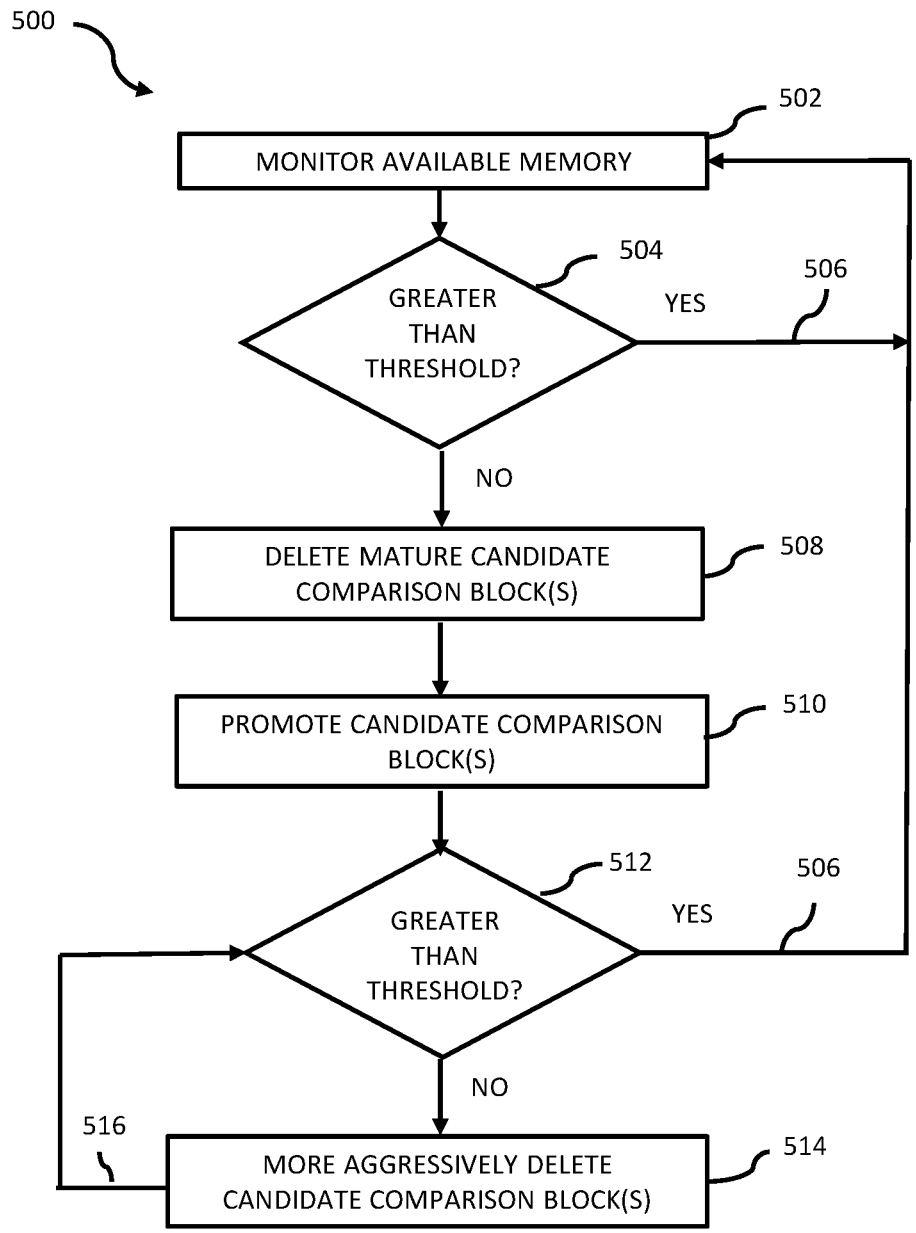
FIG. 5 is a flow diagram of an example method for performing a global garbage collection technique on candidate comparison blocks in a storage system.

FIG. 5 is a flow diagram of an example method 500 for performing at least a portion of an example global garbage collection technique on candidate comparison blocks in a storage system 100, storage system 100A, and/or storage system 100B. As shown, some embodiments of method 500 may begin by monitoring an amount of available storage space in a cache memory device 108 including an auxiliary memory 112A and/or an auxiliary database 112B (block 502) to determine if there is greater than a threshold amount or relative amount of available memory space for storing candidate comparison blocks (block 504). A threshold amount or relative amount of available memory space may be any percentage or quantity of available memory, as discussed elsewhere herein.

If/when the amount of available memory is greater than or equal to the threshold amount or relative amount (e.g., a YES in block 504), method 500 may continue monitoring the amount of available storage space in cache memory device 108 (return 506). If/when the amount of available memory in cache memory device 108 is less than the threshold amount or relative amount (e.g., a NO in block 504), one or more candidate comparison blocks having an age greater than a predetermined or relative age or a mature candidate comparison block may be deleted to free-up memory space in cache memory device 108 (block 508). A predetermined age may be any age that enables a candidate comparison block to include a relative amount of age so that its usefulness can be determined, as discussed elsewhere herein.

In some embodiments, if/when there may not be a relative amount of space in buffer memory 110, a candidate comparison block with a score greater than or equal to a threshold/relative value may be promoted to a comparison block in buffer memory 110 to free additional memory space (block 510). In some embodiments, a score may be calculated utilizing operations based on an age metric, a hit count metric, and/or the like metrics, etc., as discussed elsewhere herein.

A particular score resulting in promotion of a candidate comparison block may be a score relative to the scores of other candidate comparison blocks. In some embodiments, a calculated score for one or more candidate comparison blocks may be arranged in descending order, a quantity of available slots for promoted candidate comparison blocks in buffer memory 110 may be determined, and a number of candidate comparison blocks with the highest scores and corresponding to the number of available slots may be promoted.

Subsequent to block 508 (and possibly block 510), method 500 may include determining if there is greater than the threshold amount or relative amount of available memory space for storing candidate comparison blocks (block 512). If/when the amount of available memory is greater than or equal to the threshold amount or relative amount (e.g., a YES in block 512), method 500 may return to monitoring the amount of available storage space (return 506). If/when the amount of available memory remains less than the threshold amount or relative amount or does not free up a relative amount of storage space (e.g., a NO in block 512), method 500 may perform operations to more aggressively delete one or more candidate comparison blocks, as discussed elsewhere herein (block 514).

Subsequent to performing operations to more aggressively delete one or more candidate comparison blocks, method 500 may again determine if/when there is greater than the threshold amount or relative amount of available memory space for storing candidate comparison blocks (return 516). If/when the amount of available memory is greater than or equal to the threshold amount or relative amount (e.g., YES in block 512), method 500 may return to monitoring the amount of available storage space (return 506). If/when the amount of available memory remains less than the threshold amount or relative amount or does not free up a relative amount of storage space (e.g., a subsequent NO in block 512), more aggressive delete operations may further include temporarily ceasing operations that attempt to delete candidate comparison blocks for a predetermined amount of time and may resume the more aggressive deletion operations upon the expiration of the predetermined amount of time (return 516), which operations can be repeated until operations that attempt to delete candidate comparison blocks may be resumed.

Figure 6:
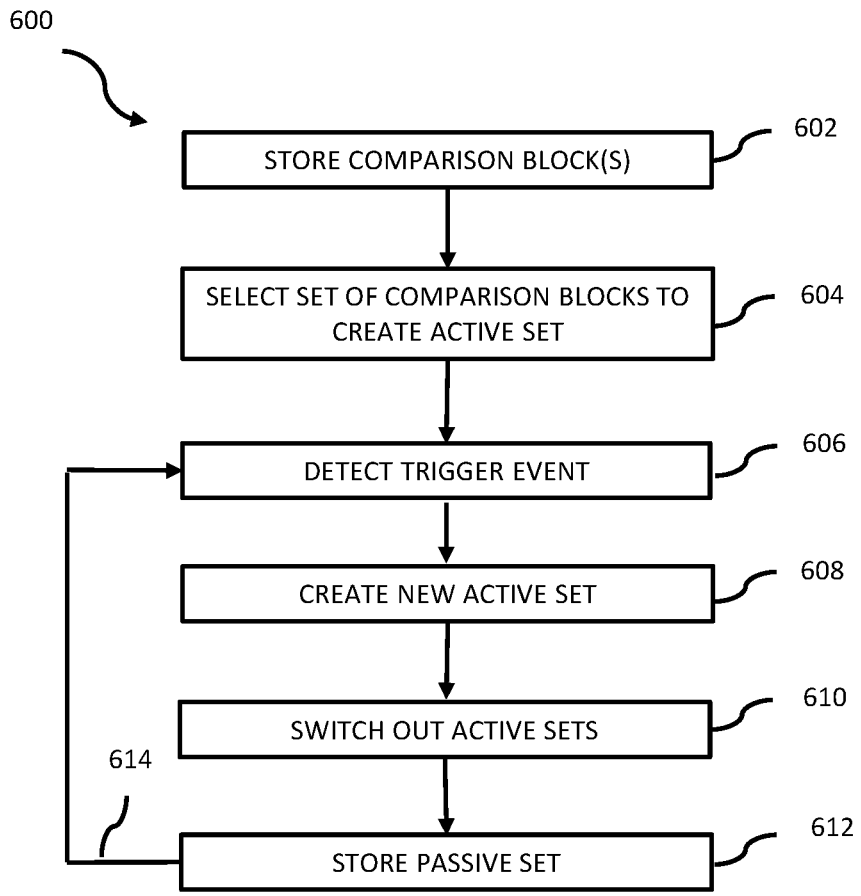
FIG. 6 is a flow diagram of an example method for managing comparison blocks in a storage system.

With reference to FIG. 6, a flow diagram of an example method 600 for managing comparison blocks in a storage system 100, storage system 100A, and/or storage system 100B is illustrated. As shown, some embodiments of method 600 may begin by storing one or more comparison blocks in a buffer memory 110 of a cache memory device 108 (block 602), which can comprise a library of comparison blocks 114.

A set of comparison blocks may be selected to function as an active set 116 in buffer memory 110 and for use in conjunction with a data deduplication technique (block 604). Some comparison blocks included in the current active set 116 may be selected because they include a calculated score that is greater than or equal to a predetermined or relative score based on one or more an LBN factor, a recent-lookup factor, and/or a deduplication ratio factor, etc., as discussed elsewhere herein.

A predetermined event may be detected in the data deduplication technique (block 606). A predetermined event may be the expiration of a predetermined amount or quantity of time, receipt of a predetermined amount or quantity of user data blocks from one or more client devices 25, a predetermined number or quantities of hits/matches of one or more comparison blocks not included in the current active set, a predetermined number or quantities of hits/matches of one or more comparison blocks not included in the current active set within a predetermined amount of time, less than or equal to a predetermined number or relative number of hits/matches of one or more comparison blocks in the current active set within a predetermined amount of time, and/or the like predetermined events, etc., as discussed elsewhere herein.

Upon detection of a predetermined event, a new active set 116 may be created (block 608) and a current active set 116 may be switched out with the newly created active set 116 (block 610). A portion of the comparison blocks included in the new active set 116 may be comparison blocks that were carried over or not dropped from a previous active set 116, is/are candidate comparison blocks that were promoted to a comparison block, include a calculated score based on the above-referenced metrics, include a score that is greater than a median or relative score, and/or include a score higher than 80% of the median score, etc., as discussed elsewhere herein.

Upon switching active sets 116, a switched out or retired active set 116 may be stored in buffer memory 110 as a passive set 118 (block 612). Blocks 606 through 612 may be repeated in conjunction with performing the data deduplication technique (return 614).

Figure 7:
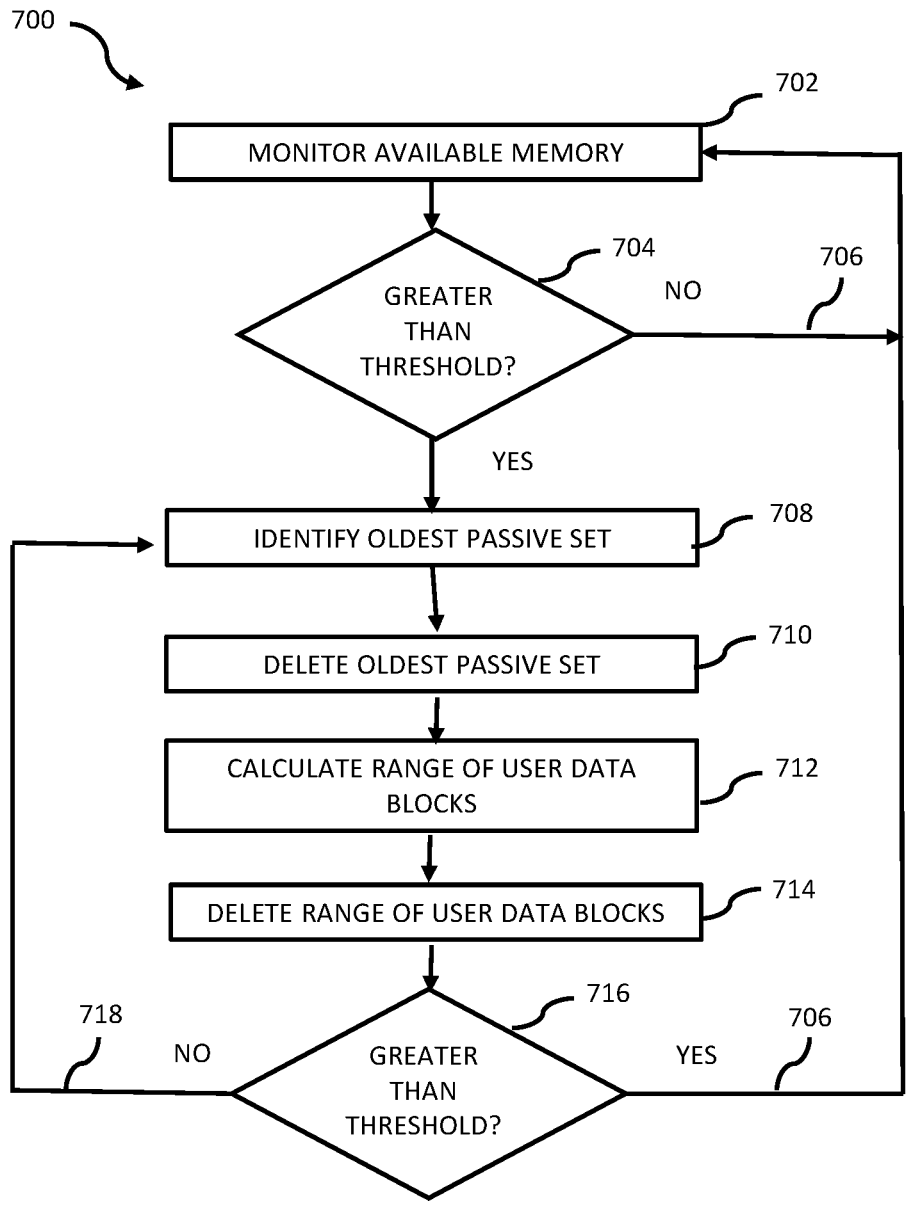
FIG. 7 is a flow diagram of an example method for performing a forced garbage collection technique on comparison blocks in a storage system.

FIG. 7 is a flow diagram of an example method 700 for performing at least a portion of a global garbage collection technique (e.g., a forced garbage collection technique and/or portion thereof) on one or more passive sets 118 in a storage system 100, storage system 100A, and/or storage system 100B. As shown, some embodiments of method 700 may begin by monitoring an amount of available storage space in a cache memory device 108 including a buffer memory 110 (block 702) to determine if there is greater than a threshold amount or relative amount of available memory space for storing passive sets 118 (block 704). A threshold amount may be any percentage or quantity of available memory in buffer memory 110, as discussed elsewhere herein.

If/when the amount of available memory is or relative or equal to the threshold amount (e.g., a YES in block 704), method 700 may continue monitoring the amount of available storage space in buffer memory 110 (return 706). If/when the amount of available memory is less than the threshold/relative amount (e.g., a NO in block 704), the oldest passive set 118 may be identified (block 708) and subsequently deleted from buffer memory 110 (block 710).

A passive set 118 may be provided with a sequence number that can be used to identify its age, as discussed elsewhere herein.

In various embodiments, a range of user data blocks in one or more storage devices 102 represented by comparison blocks in a deleted passive set 118 may be calculated (block 712). Once identified, one or more user data blocks in the calculated range may be deleted from storage device(s) 102 (block 714).

After a passive set 118 is deleted from buffer memory 110, the amount of available memory space in buffer memory 110 for storing passive sets 118 may again be determined (block 716). If/when the amount of available memory is greater than or equal to the threshold amount or relative amount (e.g., a YES in block 716), method 700 may return to monitoring the amount of available storage space in buffer memory 110 (return 706). If/when the amount of available memory remains less than the threshold amount or relative amount (e.g., a NO in block 716), blocks 708 through 716 may be repeated for a next oldest passive set 118 (return 718).

Figure 8:
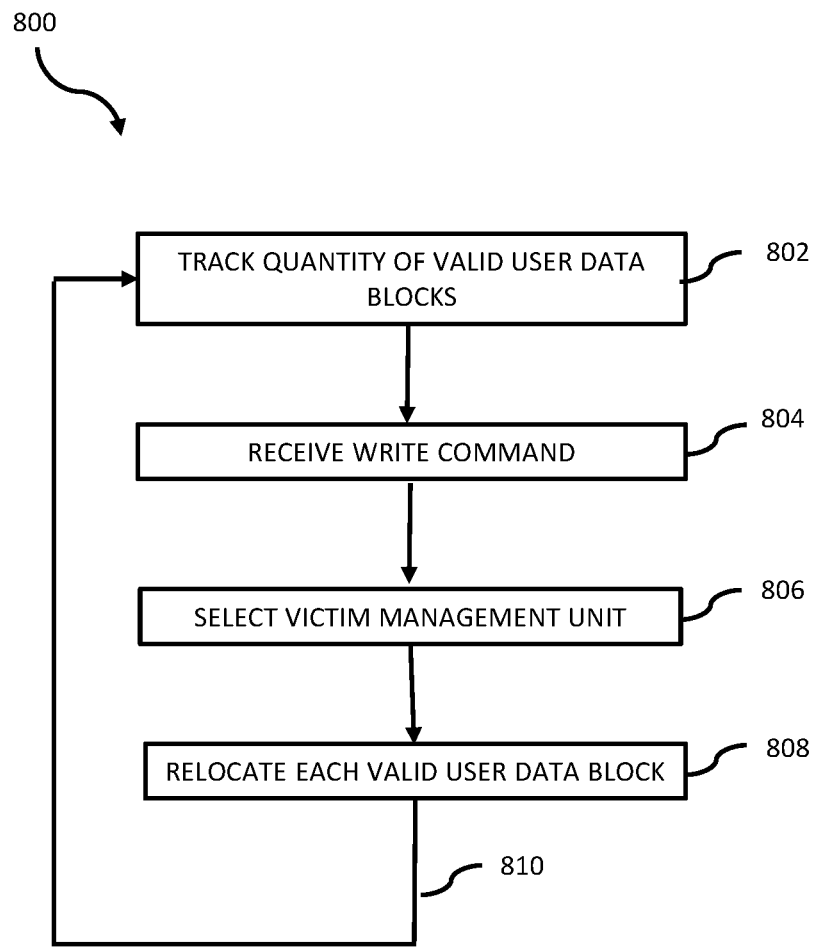
FIG. 8 is a flow diagram of an example method for performing a local garbage collection technique in a storage system.

With reference to FIG. 8, a flow diagram of a method 800 for performing an example local garbage collection technique in a storage system 100, storage system 100A, and/or storage system 100B is illustrated. The storage system 100 may comprise, among other components, storage devices 102 with physical storage space divided into multiple management units for storing user data blocks and/or reference blocks, as discussed elsewhere herein.

As shown in FIG. 8, some embodiments of method 800 may begin by tracking a number or quantity of valid user data blocks in one or more management units (block 802). In various embodiments, a valid user data block can be a user data block that includes the data originally written to a management unit or data in a management unit that has not been over-written with new data, as discussed elsewhere herein.

An input/output request (e.g., a write request) to store one or more user data blocks in an incoming data stream may be received (block 804). A victim management unit may be selected to store the user data block(s) based a quantity of stored valid user data blocks, as discussed elsewhere herein (block 806).

Subsequently, one or more valid data blocks in the victim management unit may be relocated (block 808). A valid user data blocks may be relocated by reading the valid user data block to buffer memory 110 and writing/re-writing the valid user data block a new location in storage devices 102 using a Moved-Compressed technique, a Compression-as-part-of-Relocation technique, and/or a Re-encode technique, etc., as discussed elsewhere herein.

Blocks 802 through 808 may be repeated (return 810) so that data in one or more subsequent incoming data streams can be stored in storage system 100. A local garbage collection technique can effectively free storage space and/or contiguous storage in one or more management units. After storage space is freed up, user data blocks and/or reference blocks of for an incoming data stream can be stored in the management unit(s), which may result in storage devices 102 being utilized more efficiently.

Figure 9:
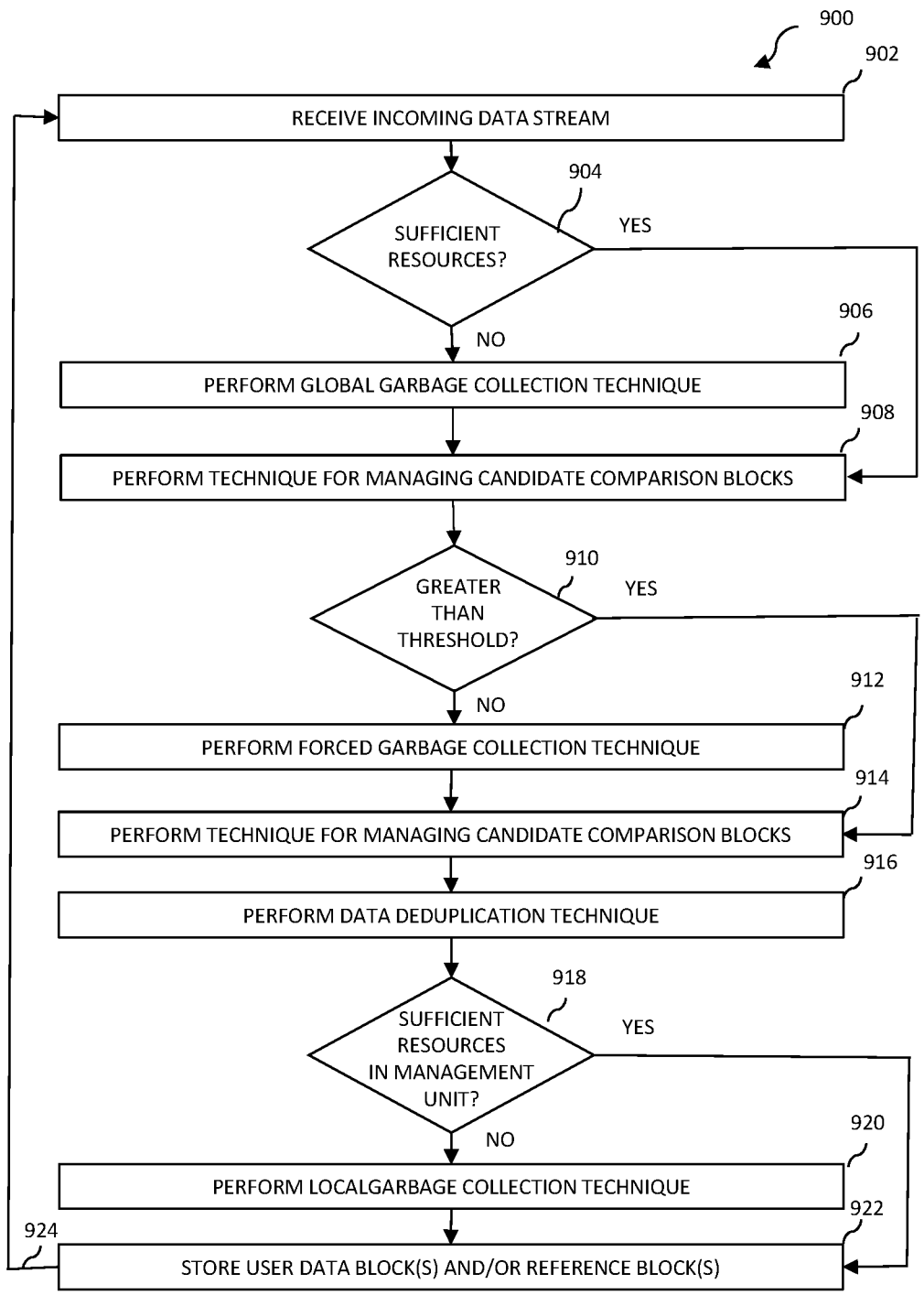
FIG. 9 is a flow diagram of an example method for performing storage operations in a storage system.

FIG. 9 is a flow diagram of an example method 900 for performing storage operations in a storage system 100, storage system 100A, and/or storage system 100B. As shown, some embodiments of method 900 may begin by receiving an incoming data stream (block 902). A determination may be made to determine if an auxiliary memory 112A and/or auxiliary database 112B of a cache memory device 108 includes a relative amount of available storage space to store one or more additional or new candidate comparison blocks (block 904).

If/when there may not be a relative amount of available storage space (e.g., a NO in block 904), a global garbage collection technique or portion thereof (e.g., method 500) may be performed to make free up a relative amount of storage space to store one or more additional candidate comparison blocks (block 906). Performing a global garbage collection technique may result in one or more candidate comparison blocks being deleted from the auxiliary memory 112A and/or auxiliary database 112B.

A technique for managing candidate comparison blocks (e.g., method 400) may be performed subsequent to performing the global garbage collection technique if/when there is a relative amount of available storage space in the auxiliary memory 112A and/or auxiliary database 112B for one or more additional candidate comparison blocks (e.g., a YES in block 904) (block 908). A technique for managing candidate comparison blocks may be performed before, after, and/or simultaneously with performing the global garbage collection technique. Performing a technique for managing candidate comparison blocks may result in one or more new candidate comparison blocks being created in or added to auxiliary memory 112A and/or auxiliary database 112B and/or one or more candidate comparison blocks being promoted to a comparison block in a buffer memory 110.

A determination may be made to determine if buffer memory 110 includes a relative amount of available storage space to store one or more additional or new comparison blocks (block 910). If/when there may not be a relative amount of available storage space in auxiliary memory 112A and/or auxiliary database 112B (e.g., a NO in block 910), a forced garbage collection technique (e.g., method 700 and/or method 500) may be performed to make available a relative amount of storage space to store one or more additional comparison blocks (block 912).

Performing a forced garbage collection technique may result in one or more passive sets 118 and/or comparison blocks being deleted from auxiliary memory 112A and/or auxiliary database 112B. Further, performing a forced garbage collection technique may delete a range of user data blocks in one or more of storage devices 102 represented by the comparison blocks in one or more deleted passive sets 118.

When/if there is a relative amount of available storage space in auxiliary memory 112A and/or auxiliary database 112B to store one or more additional passive sets 118 and/or comparison blocks and/or after performing the forced garbage collection technique (e.g., a YES in block 910), a technique for managing comparison blocks (e.g., method 600) may be performed (block 914). A technique for managing comparison blocks may be performed before, after, and/or simultaneously with performing a forced garbage collection technique. Performing a technique for managing comparison blocks may result in a new active set 116, one or more additional or new passive sets 118, and/or one or more additional comparison blocks being added to buffer memory 110.

Method 900 may further include utilizing a current active set 116 in conjunction with performing a data deduplication technique on one or more user data blocks in an incoming data stream (block 916). Some data deduplication techniques may compare the user data block(s) in the incoming stream and the comparison block(s) in a current active set 116 to determine if there is a match and store the unmatched user data block(s) and/or the reference block(s) for the matched user data block(s) in storage devices 102, as discussed elsewhere herein.

A determination may be made to determine if one or more management units in storage device(s) 102 includes a relative amount of available storage space to store the user data block(s) and/or the reference block(s) for the incoming data stream (block 918). If a relative amount of storage space is unavailable (e.g., a NO in block 918), a local garbage collection technique (e.g., method 800) may be performed (block 920). Some local garbage collection techniques may select one or more victim management units and relocate one or more valid data blocks in one or more victim management units to free up a relative amount of storage space and/or contiguous storage space in one or more management units so that the user data block(s) and/or the reference block(s) in the incoming data stream may be stored, as discussed elsewhere herein. After a relative amount of storage space and/or contiguous storage space in the management unit(s) has been freed up by a local garbage collection technique, the user data block(s) and/or reference block(s) for the incoming data stream may be stored in a victim management unit (block 922).

If a relative amount of storage space is available (e.g., a YES in block 918), the user data block(s) and/or reference block(s) for the incoming data stream may be stored in a victim management unit (block 922). Blocks 902 through 922 may be repeated for one or more subsequent incoming data streams (return 924).

To review, the various networks, systems, and methods discussed above include hardware and/or software to manage data blocks in storage systems 100, 100A, and/or 100B. The various embodiments enable storage systems 100, 100A, and/or 100B to store one or more user data blocks in an incoming data stream that do not match a current active set 116, which can help to ensure that storage systems 100, 100A, and/or 100B can appropriately react to any change, big or small, in incoming data stream patterns. By properly vetting comparison blocks and/or candidate comparison blocks, storage systems 100, 100A, and/or 100B can help to ensure that useful comparison blocks and/or candidate comparison blocks are included in an active set 116. Further, so called one-off deviations in user data blocks of incoming data streams may not cause problems because the creation of candidate comparison blocks representing these user data blocks can help to ensure that these deviations will not be used for comparison because they may not be promoted to actual comparison blocks, which can assist in effectively regulating (e.g., limiting and/or eliminating) the number of comparison blocks included in the current active set 116.

While at least one exemplary embodiment has been presented in the foregoing detailed description of the technology, it can be appreciated that a vast number of variations may exist. It can also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, RAM, ROM, an EPROM, an EEPROM, a Flash memory, an optical fiber, a CD-ROM, an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that one or more blocks of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It can also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A method of operation for managing data blocks, comprising:
   storing, in a non-volatile cache memory device, a comparison block library;
   selecting a first set of comparison blocks in the comparison block library to create an active set of comparison blocks;
   utilizing the active set in conjunction with a data deduplication technique;
   determining an occurrence of a predetermined event in the data deduplication technique;
   selecting a second set of comparison blocks in the comparison block library to create a new active set of comparison blocks in response to the predetermined event;
   replacing the active set with the new active set;
   storing a passive set of comparison blocks based on the active set that is replaced with the new active set; and
   utilizing the new active set in conjunction with the data deduplication technique.

2. The method of claim 1, further comprising one of:
   selecting at least one comparison block in the active set for inclusion in the new active set;
   selecting at least one comparison block in the comparison block library not in the active set for inclusion in the new active set; and
   selecting at least one comparison block in the active set for inclusion in the new active set and at least one comparison block in the comparison block library not in the active set for inclusion in the new active set.

3. The method of claim 1, further comprising:
   storing, in an auxiliary database, candidate comparison blocks;
   receiving a data block for storage;
   comparing the data block and comparison blocks in the non-volatile cache memory device for a match;
   comparing the data block and the candidate comparison blocks in the auxiliary database for a match; and
   responsive to the data block not matching any of the comparison blocks in the non-volatile cache memory device and not matching any of the candidate comparison blocks in the auxiliary database, adding the data block to the candidate comparison blocks in the auxiliary database.

4. The method of claim 3, further comprising:
   responsive to the data block not matching any of the comparison blocks in the non-volatile cache memory device and matching a candidate comparison block in the auxiliary database, incrementing a counter associated with the candidate comparison block; and
   responsive to the counter reaching a predetermined threshold count, promoting the candidate comparison block to a reference block in the non-volatile cache memory device.

5. The method of claim 4, wherein:
   a match is determined responsive to data in the data block matching at least a relative percentage of data in a comparison block or a candidate comparison block; and
   a non-match is determined responsive to data in the data block matching less than the relative percentage of data in a comparison block or a candidate comparison block.

6. The method of claim 1, further comprising:
   removing one or more comparison blocks from the comparison block library responsive to the one or more comparison blocks being no longer representative of a data block in the non-volatile memory system.

7. A system, comprising:
   a non-volatile cache memory device to store a comparison block library;
   means for calculating scores for comparison blocks in the comparison block library;
   means for selecting a first set of comparison blocks in the comparison block library to create an active set of comparison blocks;
   means for utilizing the active set in conjunction with a data deduplication technique;
   means for determining an occurrence of a predetermined event in the data deduplication technique;
   means for selecting a second set of comparison blocks in the comparison block library to create a new active set of comparison blocks in response the predetermined event;
   means for replacing the active set with the new active set; and
   means for utilizing the new active set in conjunction with the data deduplication technique.

8. The system of claim 7, further comprising one of:
   means for selecting at least one comparison block in the active set for inclusion in the new active set;

means for selecting at least one comparison block in the comparison block library not in the active set for inclusion in the new active set; and means for selecting at least one comparison block in the active set for inclusion in the new active set and at least one comparison block in the comparison block library not in the active set for inclusion in the new active set.

9. A non-volatile memory system, comprising:
a non-volatile cache memory device including a buffer memory to store a comparison block library; and
a storage controller coupled to the non-volatile cache memory device, the storage controller configured to:
  calculate scores for comparison blocks in the comparison block library;
  select a first set of comparison blocks in the comparison block library to create an active set of comparison blocks, wherein the first set of comparison blocks is selected based on the scores of the comparison blocks;
  utilize the active set in conjunction with a data deduplication technique;
  determine an occurrence of a predetermined event in the data deduplication technique;
  select a second set of comparison blocks in the comparison block library to create a new active set of comparison blocks in response to the predetermined event, wherein the second set of comparison blocks is selected based on the scores of the comparison blocks;
  replace the active set with the new active set; and
  utilize the new active set in conjunction with the data deduplication technique.

10. The non-volatile memory system of claim 9, wherein the storage controller is further configured to store a passive set of comparison blocks based on the active set that is replaced with the new active set.

11. The non-volatile memory system of claim 9, wherein selecting the second set further comprises carrying over at least one comparison block in the first set for inclusion in the second set.

12. The non-volatile memory system of claim 11, wherein selecting the second set further comprises selecting at least one comparison block not included in the first set for inclusion in the second set.

13. The non-volatile memory system of claim 9, wherein selecting the second set further comprises dropping at least one comparison block in the first set from inclusion in the second set.

14. The non-volatile memory system of claim 9, wherein calculating the scores for the comparison blocks further comprises calculating each of the scores based on at least one of a logical block count (LBN) factor, a recent-lookup factor, and a deduplication ratio factor.

15. The non-volatile memory system of claim 14, wherein calculating the scores for the comparison blocks further comprises providing a weighting factor to at least one of the LBN factor, the recent look-up factor, and the deduplication ratio factor.

16. The non-volatile memory system of claim 9, wherein:
the non-volatile cache memory device further includes an auxiliary memory to store candidate comparison blocks; and
the storage controller is further configured to:
  receive a data block for storage;
  compare the data block to comparison blocks in the buffer memory for a match;
  compare the data block to the candidate comparison blocks in the auxiliary memory for a match; and
  responsive to the data block not matching any of the comparison blocks in the buffer memory and not matching any of the candidate comparison blocks in the auxiliary memory, add the data block to the candidate comparison blocks in the auxiliary memory.

17. The non-volatile memory system of claim 16, wherein the storage controller is further configured to determine a match responsive to data in the data block matching at least a predetermined percentage of data in any comparison block or any candidate comparison block.

18. The non-volatile memory system of claim 9, wherein:
the non-volatile cache memory device further includes an auxiliary memory to store candidate comparison blocks; and
the storage controller is further configured to:
  receive a data block for storage;
  compare the data block and the candidate comparison blocks in the auxiliary memory for a match; and
  responsive to the data block not matching any of the comparison blocks in the buffer memory but matching a candidate comparison block in the auxiliary memory, increment a counter associated with the candidate comparison block.

19. The non-volatile memory system of claim 9, wherein:
the non-volatile cache memory device further includes an auxiliary memory to store candidate comparison blocks; and
the storage controller is further configured to, responsive to a counter associated with a candidate comparison block exceeding a predetermined threshold count, promote the candidate comparison block in the auxiliary memory to a comparison block in the buffer memory.

20. The non-volatile memory system of claim 9, wherein the storage controller is further configured to, responsive to a comparison block being no longer representative of a data block in the non-volatile memory system, remove the comparison block from the comparison block library.

* * * * *